US011068788B2

(12) United States Patent
Malek et al.

(10) Patent No.: US 11,068,788 B2
(45) Date of Patent: Jul. 20, 2021

(54) AUTOMATIC GENERATION OF HUMAN-UNDERSTANDABLE GEOSPATIAL DESCRIPTORS

(71) Applicant: Lyft, Inc., San Francisco, CA (US)

(72) Inventors: Yuanyuan Malek, San Francisco, CA (US); James Kevin Murphy, San Francisco, CA (US); Asif Haque, Orinda, CA (US); Ramesh Rangarajan Sarukkai, Los Gatos, CA (US)

(73) Assignee: Lyft, Inc., San Francisco, CA (US)

( * ) Notice: Subject to any disclaimer, the term of this patent is extended or adjusted under 35 U.S.C. 154(b) by 877 days.

(21) Appl. No.: 15/829,965

(22) Filed: Dec. 3, 2017

(65) Prior Publication Data

US 2019/0171943 A1    Jun. 6, 2019

(51) Int. Cl.
*G06N 5/02* (2006.01)
*G06Q 50/30* (2012.01)
*G06N 20/00* (2019.01)
*G06F 16/29* (2019.01)

(52) U.S. Cl.
CPC ............... *G06N 5/02* (2013.01); *G06F 16/29* (2019.01); *G06N 20/00* (2019.01); *G06Q 50/30* (2013.01)

(58) Field of Classification Search
CPC ........ G06N 5/02; G06N 20/00; G06N 99/005; G06F 16/29; G06F 16/338; G06F 17/30241; G06Q 50/30

USPC .......................................................... 706/46
See application file for complete search history.

(56) References Cited

U.S. PATENT DOCUMENTS

| 2017/0089715 | A1* | 3/2017 | Guo ...................... H04L 67/18 |
| 2017/0270925 | A1* | 9/2017 | Kennewick ............. G10L 15/00 |
| 2017/0293950 | A1* | 10/2017 | Rathod .............. G06Q 30/0639 |
| 2018/0058863 | A1* | 3/2018 | Meyer ................ G01C 21/3415 |
| 2018/0211542 | A1* | 7/2018 | Narayan ................ G08G 1/205 |
| 2018/0342035 | A1* | 11/2018 | Sweeney ................ G08G 1/202 |
| 2019/0078901 | A1* | 3/2019 | Jalasutram ........... G01C 21/343 |
| 2019/0171732 | A1* | 6/2019 | Yanez .................... G06N 20/00 |

* cited by examiner

*Primary Examiner* — Dave Misir
(74) *Attorney, Agent, or Firm* — Baker Botts L.L.P.

(57) ABSTRACT

A disclosed method may include receiving geographic coordinates of a location at which two parties are to rendezvous, generating a human-understandable geospatial descriptor for the request location, and sending the descriptor to respective devices of the two parties for presentation to the two parties. Generating the human-understandable geospatial descriptor may include identifying a human-visible feature in the vicinity of the request location that is labeled within available map data, selecting, based on a descriptor generation model, a reference expression relative to the identified feature, and applying a grammar-based constructor to the label and the selected reference expression to form the human-understandable geospatial descriptor. The model may be tuned using machine learning. The two parties may include a ride requestor and a ride provider in a ridesharing service. The identified feature may be a point of interest, landmark, street name, intersection, marker, or structure.

20 Claims, 8 Drawing Sheets

US 11,068,788 B2

AUTOMATIC GENERATION OF HUMAN-UNDERSTANDABLE GEOSPATIAL DESCRIPTORS

BACKGROUND

A transportation management system, in response to ride requests, may match the needs of ride requestors with ride providers who are willing to use their vehicles to provide the requested rides. For instance, through a transportation application installed on a mobile device, a ride requestor may submit a request for a ride from a starting location to a destination at a particular time. In response to the request, the transportation management system may match the ride requestor with any number of available ride providers and notify a matching ride provider of the ride request. The ride providers, through the transportation application installed on their respective mobile devices, may see the request notification and accept or reject the ride request. Once a ride provider accepts the request, the transportation management system may, in response, facilitate the ride between the ride requestor and the ride provider.

In conventional transportation management systems, a ride requestor specifies a desired pick-up location by entering a place name or street address in the transportation application installed on their mobile device, or by annotating a map view within the transportation application with a "pin" dropped at the desired pick-up location. In some cases, however, even when basic location information (e.g., an annotated map view, a place name, and/or a street address) is provided to a ride provider in a ride request, it can be difficult for ride requestors and ride providers to find each other for pick up. In some cases, ride requestors and ride providers may communicate with each other using text messages or phone calls to exchange additional information useful for locating each other, such as identifying characteristics of the ride requestor, the ride provider, or the ride provider's vehicle, or a more detailed description of the desired pick-up location.

DESCRIPTION OF EXAMPLE EMBODIMENTS

Figure 1:
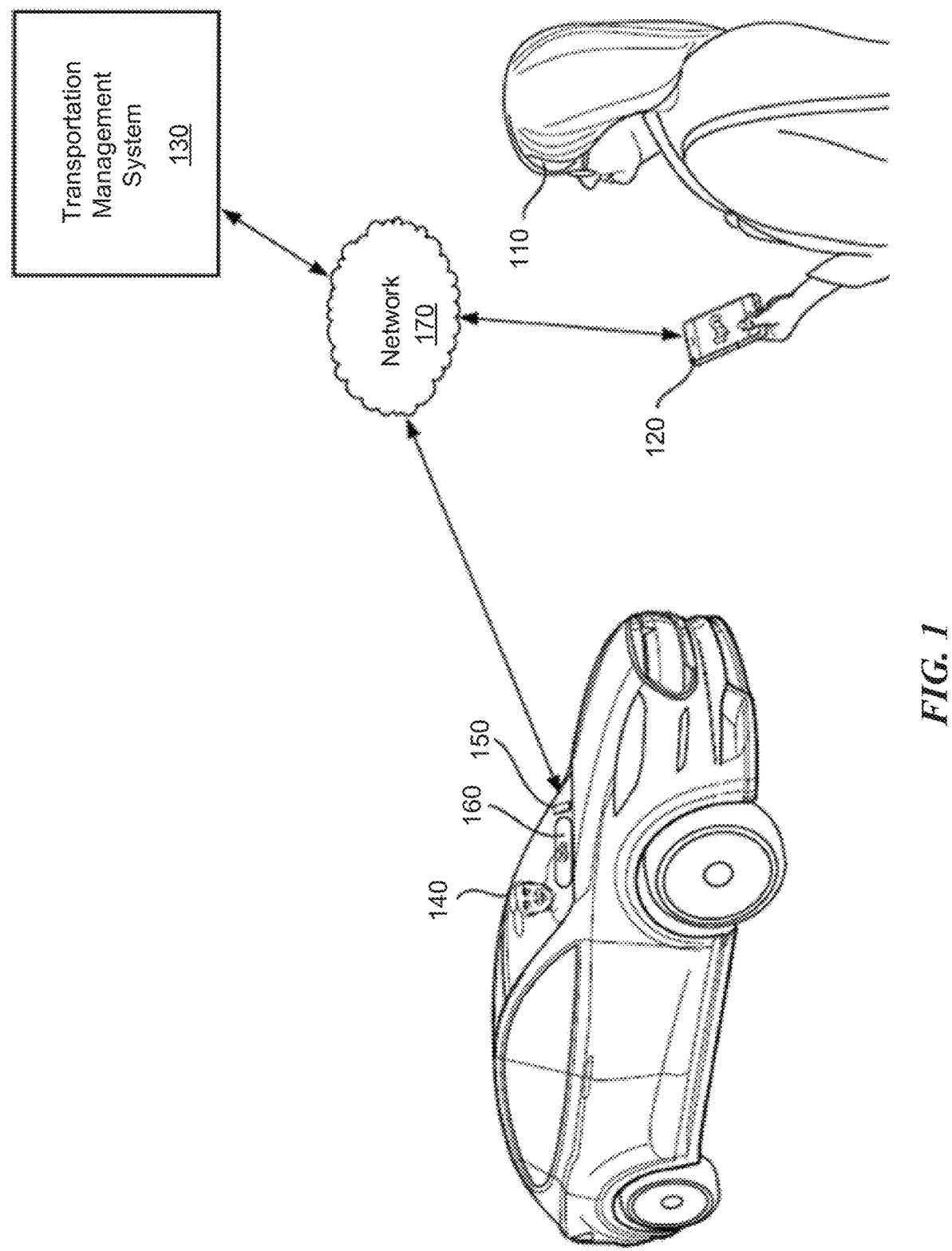
FIG. 1 illustrates an example of a transportation management system for matching ride requestors with ride providers.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

A transportation management system may, on behalf of a ridesharing service, match ride requestors with ride providers who are willing to use their vehicles to provide requested rides. Traditionally, the transportation management system may provide basic pick-up location information to ride requestors and ride providers to facilitate rendezvous between the two parties. For example, the transportation management system may provide an annotated map view, a place name, and/or a street address identifying a pick-up location to a ride provider who has accepted a ride request starting at the identified pick-up location. In some cases, however, even when basic location information is provided to a ride provider in a ride request, it can be difficult for ride requestors and ride providers to find each other for pick up. For example, when a pin is dropped on a building in a map view, it may be unclear where, in particular, the ride requestor is waiting or is expecting to be picked up, as there may be multiple potential pick-up locations at or near the pinned building. In some cases, ride requestors and ride providers may communicate with each other using text messages or phone calls to exchange additional information, some of which may be useful for locating each other. This additional information, which might or might not be provided for any given ride depending on how difficult it is for the parties to find one another amongst other factors, may include identifying characteristics of the ride requestor (e.g., "I'm wearing a blue shirt and have black hair"), identifying characteristics of the ride provider (e.g., "I'm wearing a red shirt"), identifying characteristics of the ride provider's vehicle (e.g., "I'm in the blue sedan with the windows down"), a more detailed description of the desired pick-up location (e.g., "I'm under the blue sign on the right side of the street"), or in general any communications exchanged between the parties, including phrases such as, "Where are you?" or "On my way."

In particular embodiments, a transportation management system of a ridesharing service may use machine learning to train a model for generating human-understandable geospatial descriptors for specified pick-up locations to assist ride requestors and ride providers in finding each other at the specified pick-up locations. In particular embodiments, when ride requests are fulfilled by autonomous vehicles, human-understandable geospatial descriptors may be generated for the specified pick-up locations and provided to the ride requestors to assist them in finding the autonomous vehicles that are dispatched to pick them up. The machine learning model may be seeded by inputting reference expressions (which may otherwise be known as "referring expressions") extracted from free-form text exchanged between ride requestors and ride providers or derived from the extracted reference expressions and/or map data that has been encoded with labels representing place names and/or street addresses associated with certain locations (e.g., points of interest, landmarks, street names, intersections, markers, or structures) or representing visible characteristics of various points of interest, landmarks, street names, intersections, marker, or structure, such as a color, shape or size. Once the model for generating human-understandable geospatial descriptors for specified locations has been trained, it may be used to generate human-understandable geospatial descriptors for specified locations that are represented in the seed data that was input to the model and/or for specified locations that are not represented in the seed data that was input to the model.

Particular embodiments described herein relate to generating, by a transportation management system, a human-understandable geospatial descriptor for a specified meeting location, such as a pick-up location at which a ride requestor and a ride provider may rendezvous in response to the ride provider accepting a ride request submitted by the requestor. Generating the human-understandable geospatial descriptor may include identifying a human-visible feature in the vicinity of the meeting location that is associated (e.g., in encoded map data) with a label, selecting, based on a machine learning model for generating human-understandable descriptions of locations, a reference expression relative to the identified feature, and applying a grammar-based constructor to the label associated with the identified feature and the selected reference expression to form the human-understandable geospatial descriptor. The human-understandable geospatial descriptor may then be served to computing devices operated by the ride requestor and/or the ride provider for presentation to the two parties.

Particular embodiments address the inadequacy of providing only basic location information, such as an annotated map view, a place name, and/or a street address, to ride requestors and ride providers in ridesharing service environments in which it can be difficult for them to find each other. By generating human-understandable geospatial descriptors and serving the descriptors to ride requestors and ride providers, the transportation management systems described herein may improve the efficiency of pick-ups for the ridesharing service and reduce frustration for both ride requestors and ride providers when basic location information provided in a ride request is insufficient to facilitate an efficient and timely rendezvous between the parties. In some embodiments, the human-understandable geospatial descriptors may be more expressive and, in many cases, more specific, than basic location information. By providing human-understandable geospatial descriptors to ride requestors and ride providers, and incorporating the types of information that have exchanged by people in similar environments, the transportation management system may emulate the way humans talk to each other when trying to find each other. The automation of human-understandable geospatial descriptor generation allows the ridesharing service to realize these improvements, even when specified pick-up locations are new to the service, without the need to expend significant engineering effort to manually generate human-understandable geospatial descriptors for every potential pick-up location and to incorporate those descriptors into location services provided by the transportation management system on behalf of the ridesharing service.

FIG. 1 illustrates an example of a transportation management system 130 for matching ride requestors 110 and ride providers 140, in accordance with particular embodiments described herein. The transportation management system 130 may be configured to communicate with both the requestor's 110 computing device 120 and the provider's 140 computing device 150. The provider computing device 150 may be configured to communicate with a transportation management vehicle device 160 that is configured to easily and efficiently provide information to a provider 140 and/or a requestor 110, obtain internal sensor data pertaining to the passenger compartment of the vehicle, and/or adjust configurations of the vehicle.

In particular embodiments, the requestor 110 may use a transportation application running on a requestor computing device 120 to request a ride from a specified pick-up location to a specified drop-off location. The request may be sent over a communication network 170 to the transportation management system 130. The ride request may include request information, which may include, for example, an identifier associated with the requestor and/or the requestor computing device, user information associated with the requestor, a location of the requestor computing device at the time of the request, a requested time for the ride (e.g., at a scheduled future time or an instant/current time), and/or any other relevant information for matching the ride request with ride providers as described herein. The ride request may also include transport information, such as, e.g., a pick-up location, a drop-off location, a "best fit/predictive" location (e.g., a particular location in the origination/destination region suitable for pick-up/drop-off at a given time), preferred pick-up/drop-off location type (e.g., a curb segment), or any other suitable information for indicating the requestor's transportation preferences and/or objectives. In particular embodiments, the ride request may further include any other preferences or needs of the requestor, including, for example, navigation preferences (e.g., highways vs. local streets; particular routes; stop overs), music or entertainment preferences (e.g., link to a music playlist or station hosted by a 3rd-party music provider, news station, etc.), personalized pattern/color to display on a transportation management vehicle device to help the ride provider and requestor identify each other, particular vehicle features or restrictions (e.g., pet friendly, child seat, wheelchair accessible, maximum/minimum passenger or cargo compartment, etc.).

In particular embodiments, the transportation management system 130 may, in response to a ride request, identify available providers that are registered with the transportation management system 130 through an application on their mobile computing device 150 or through an associated transportation management vehicle device 160. For example, the transportation management system 130 may locate candidate ride providers 140 who are available (e.g., based on a status indicator provided through each ride provider's 140 computing device 150) and in the general vicinity of the requested pick-up location (e.g., based on GPS data provided by the provider computing device 150 and the requestor computing device 120). The transportation management system 130 may send a notification relating to the requested ride to the computing devices 150 of the candidate ride providers 140. The notification may include information pertaining to the request, including, e.g., the pick-up and drop-off locations, recommended route, estimated time of travel, fees for the ride, the requestor's profile information (e.g., name, profile picture, ratings, etc.), particular ride requests (e.g., car seat availability), and any other pertinent information that would allow the ride provider 140 to make an informed decision as to whether to accept or reject the ride request. Upon seeing the notification, the provider 140 may accept or reject the ride request through the provider communication device 150. Additionally and/or alternatively, in particular embodiments, the provider 140 may be predictively and/or automatically matched with a ride request such that the provider 140 is not required to explicitly accept the request.

In particular embodiments, the provider computing device 150 may notify the transportation management system 130 that the provider 140 received the notification and further inform the system 130 of whether the provider 140 accepted or rejected the request. The information sent to the system 130 may include, for example, an acceptance indicator (e.g., a flag), current location of the ride provider 140, route information for transporting other passengers in the vehicle in a ride-sharing scenario (e.g., the ride provider 140 may have agreed to transport different, unrelated ride questors), schedule information regarding the ride provider's 140 future availability, diagnostics associated with the car (e.g., gas level, battery level, engine status, etc.), features, amenities, and/or limitations of the vehicle, and/or any other suitable information. In particular embodiments, the transportation management system 130 may make a further determination of the suitability of the match and select the best match for the ride requestor 110. In particular embodiments, the transportation management system 130 may provide the ride requestor 110 information pertaining to the ride providers 140 who accepted the request and allow the ride requestor 110 to select the desired provider 140. Once a match has been finalized, the provider 140 and the requestor 110 may receive information associated with the other party and relevant transport information, such as requestor 110 and provider 140 information (e.g., name, representative symbol or graphic, social-media profile, etc.), requested pick-up and drop-off locations, suggested route, current location tracking information, ratings, past ride history and reviews, and/or any other relevant information for facilitating the match and/or service being provided. In this manner, the transportation management system 130 may dynamically match ride requestors 110 and providers 140 that are distributed throughout a geographic area. Available requestors and providers may constantly be changing as providers are matched with other ride requests and/or as providers sign on and off of the transportation management system.

In particular embodiments, the transportation management system 130 may provide information to the ride requestor device 120 and the provider device 150 (and/or transportation management vehicle device 160) to facilitate the parties finding each other. For example, the system 130 may monitor the GPS locations of the requestor computing device 120 and provider computing device 150 and send location information to the respective other device. For example, as the provider computing device 150 gets closer to the request location, the transportation management system may monitor the location of the provider computing device 150 and send the location of the requestor computing device 120 to the provider computing device 150 (and vice versa). As such, the provider computing device 150 may display the current location of the requestor computing device 120 to allow the provider 140 find and pick up the requestor 110. In particular embodiments, the provider computing device 150 may determine a proximity vector between the present location of the provider computing device 150 and the location of the requestor computing device 120. Based on this information, the provider computing device 150 may provide navigating instructions to the provider 140 so that they may find the exact location of the requestor 110.

To further guide the provider 140 as they are driving, the transportation management system 130 and/or the provider computing device may determine and provide a proximity indicator (e.g., a color, pattern, image, animation, and/or pattern of colors) to be presented on a display visible to the provider 140. The display may be on the provider computing device 150, the transportation management vehicle device 160, and/or a display integrated with the vehicle. Proximity indicators may also include additional or other types of multimedia elements such as sounds, audio/visual presentations, haptic feedback (e.g., vibrations, etc.), holograms, augmented reality presentations, etc. For example, a haptic-feedback proximity indicator may cause devices within the vehicle (e.g., the computing device 150, the transportation management vehicle device 160, and/or components of the vehicle, such as the steering wheel) to vibrate. The vibration (or any other type of proximity indicator) may become stronger or weaker depending on the distance to the requestor computing device 120. The provider computing device 150 may present the proximity indicator so that the provider 140 may quickly and easily navigate to the location of the requestor 110. In particular embodiments, the provider computing device 150 may pass the proximity indicator to a transportation management vehicle device 160 that is configured to present the corresponding color, pattern, pattern of colors, animation, and/or image on a large display that can easily, intuitively, and safely be followed by the driver to the location of the requestor 110. The indicator provided through the transportation management vehicle device 160 may also be visible to the ride requestor 110 through the vehicle's windshield. In particular embodiments, the ride requestor 110, knowing or having been informed of the proximity indicator's characteristics (e.g., a particular color, greeting, animation, etc.), may look for such proximity indicator in nearby vehicles to find the ride provider 140. Similarly, the indicator may also be displayed on the requestor's computing device 120, and the requestor 110 may hold the device 120 so that nearby drivers could see the displayed proximity indicator for purposes of helping the parties locate each other.

In particular embodiments, an interaction indicator associated with the requestor 110 of a matched ride may be displayed based on the proximity between the requestor computing device 120 and the provider computing device 150. For example, when the parties are within a distance threshold of each other, an interaction indicator including a name, a graphic, and/or a greeting generated based on the requestor's information and/or provider's information may be presented on the provider computing device 150 and/or the transportation management vehicle device 160. Similar to the techniques described herein related to the proximity indicator, the interaction indicator may be displayed to provide a welcoming interaction to the requestor 110 upon the requestor 110 approaching and/or entering a vehicle of the provider 140. Similar to the proximity indicator, the interaction indicator may be displayed on any number of different displays within the provider vehicle and/or through the transportation management vehicle device 160. Additionally, the same techniques described herein regarding the provider computing device 150 may be implemented by the requestor computing device 120 to display an interaction indicator and/or proximity indicator on the requestor computing device 120 or an associated display.

Figure 2:
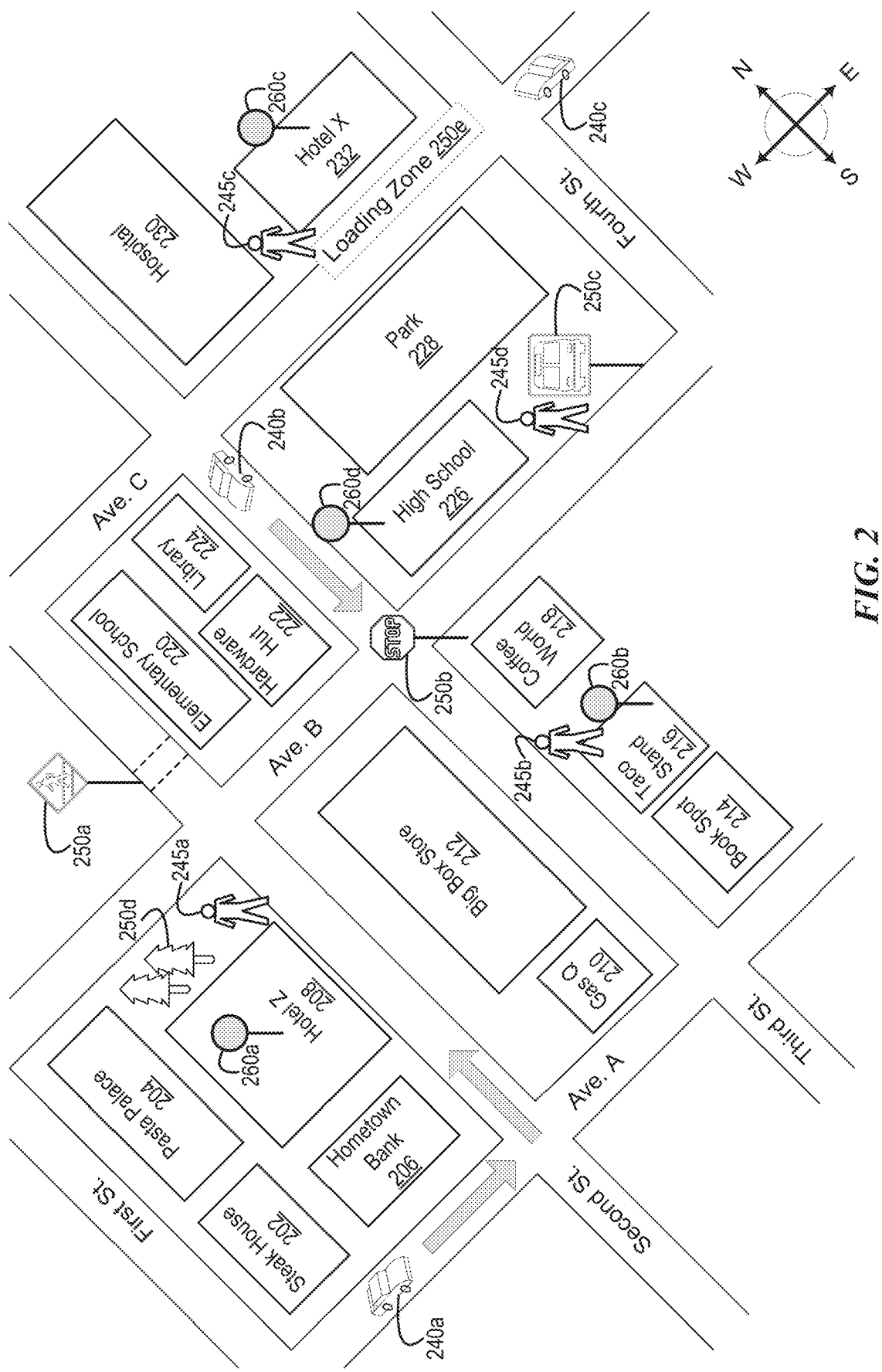
FIG. 2 illustrates an example environment in which a ridesharing service operates.

FIG. 2 illustrates an example environment 200 in which a ridesharing service operates. In this example environment, seven users of the ridesharing service are shown, including four ride requestors 245 and three ride providers 240. Each of the ride requestors 245 has, through a transportation application running on the ride requestor's computing device, requested a ride starting from a respective pick-up location. In the illustrated environment, each ride requestor has specified their desired pick-up location (e.g., by entering an address or based on current GPS location), as represented in the annotated a map view within the transportation application by a "pin" 260 dropped at the desired pick-up location. In particular embodiments, the transportation application may also provide a user interface that allows ride requestors to specify a pick-up location by tapping on the map, thereby causing a pin 260 to be dropped at the tapped location. For example, ride requestor 245a has dropped pin 260a at Hotel Z (208) on the map, indicating Hotel Z as the desired pick-up location. Similarly, ride requestor 245b has dropped pin 260b at Taco Stand 216, ride requestor 245c has dropped pin 260c at Hotel X (232), and ride requestor 245d has dropped pin 260d at High School 226. The information provided through the pin drop user interface may be converted to geographic coordinates (e.g., latitude and longitude) by a transportation management system of the ridesharing service, such as transportation management system 130 shown in FIG. 1. The transportation management system may identify a place name or a street address associated with the geographic coordinates, if this information is available to the transportation management system. For example, place names and/or street addresses associated with certain locations may be stored in map data maintained by the transportation management system or obtained through a third-party map provider or map service. In particular embodiments, this information may be stored in association with geographic coordinates of various locations and may be served (e.g., using a push notification) to computing devices used by ride requestors 245 and ride providers 240 for presentation through the transportation applications running on those devices.

As described in more detail below, in particular embodiments, a transportation management system may be configured to generate, based on data from a variety of sources, human-understandable geospatial descriptors that facilitate more efficient pick-ups by assisting ride requestors 245 and ride providers 240 in finding each other at specified pick-up locations. These human-understandable geospatial descriptors may be served to computing devices used by the ride requestors 245 and ride providers 240 for presentation through the transportation applications running on those devices instead of, or in addition to, basic location information (e.g., annotated map views, place names, and/or street addresses).

In the example illustrated in FIG. 2, ride provider 240a has been presented with a map view of environment 200 that has been annotated with pin 260a, and has accepted a request to pick up ride requestor 245a at the indicated pick-up location. The map view may be presented within a transportation application running on the ride provider's computing device. A place name or street address associated with the location of pin 260a may also be presented to ride provider 240a, either on the map or in a separate user interface element of the transportation application. Similarly, ride provider 240b has been presented with a map view of environment 200 that has been annotated with pin 260b, and has accepted a request to pick up ride requestor 245b at the indicated pick-up location. Ride provider 240b may also be presented with place name or street address information associated with the pick-up location, if available. In this example, ride provider 240c has been presented with a map view of environment 200 that has been annotated with pin 260c and pin 260d, but has not yet accepted a request to pick up ride requestor 245c or ride requestor 245d at their respective pick-up locations.

In some cases, even when basic location information (e.g., an annotated map view, a place name, and/or a street address) is provided to a ride provider 240 in a ride request, it can be difficult for ride requestors 245 and ride providers 240 to find each other for pick up. When a pin 260 is dropped on a building in a map view, it may be unclear where, in particular, the ride requestor 245 is waiting or is expecting to be picked up, as there may be multiple potential pick-up locations at or near the pinned building. For example, a ride requestor 245 may be waiting at a main entrance of the building (assuming there is a discernable main entrance), at a side or back entrance of the building, in a passenger loading zone, on the street in front of the building, or on the street beside the building, among other potential pick-up locations. In some cases, it can be difficult for a ride provider 240 to find the pick-up location using a place name or street address when signage indicating the place name or street address (e.g., a building or curb number) is difficult to see or read (e.g., due to the size or position of a sign, the size or font of the place name or address on a sign, darkness, weather conditions, or other site-specific factors).

In particular embodiments, the transportation application executing on the ride requestors' devices may allow ride requestors to include more information about the desired pick-up location in the ride request in the form of free-form text. For example, ride requestor 245a may enter text suggesting that ride requestor 245a and ride provider 240a rendezvous "outside Hotel Z." In some embodiments, the information may be communicated to ride provider 240a as a text message communicated through the transportation application, a short message service (SMS) text or a multi-media messaging service (MMS) text. In some embodiments, ride requestors and ride providers may communicate through calls made on their respective mobile devices. For example, ride requestor 245a may call ride provider 240a to suggest that they rendezvous "on the corner of Second St. and Ave. B." Similarly, in response to ride provider 240c accepting the ride requested by ride requestor 245c, for which pin 260c was dropped on Hotel X (232), ride requestor 245c may call or text ride provider 240c to say, "I'm waiting in the loading zone," indicating Loading Zone 250e outside of Hotel X (232).

In particular embodiments, transportation management system 130 may collect information exchanged between ride requestors 245 and ride providers 240 and may store the information in association with the times at which the information was exchanged and/or identifiers of the particular rides for which the information was exchanged. In some embodiments, ride requestors and/or ride providers may opt out of some or all of this data collection through the selection of various privacy settings in the transportation applications running on their respective computing devices. In some embodiments, the identities of the parties that send and/or receive the information may be anonymized. In some embodiments, the specified pick-up locations, the amount of time it took for the ride providers to pick up the ride requestors, and other information usable to determine the effectiveness of the information exchanged between ride requestors 245 and ride providers 240 may be determined based on the time and/or ride identifier associated with the information. In one example, the transportation management system may monitor and collect free-form text entered within the transportation applications running on the computing devices used by ride requestors 245 and ride providers 240. In some embodiments, the transportation management system may, through the transportation applications running on the computing devices used by ride requestors 245 and ride providers 240, monitor and/or collect free-form text exchanged between ride requestors 245 and ride providers 240 using other text messaging services or platforms during, or immediately prior to, a particular ride (e.g., the transportation application may have been granted access to the other messaging service/platform's data). In some embodiments, the transportation management system may, through the transportation applications running on the computing devices used by ride requestors 245 and ride providers 240, monitor and/or record mobile telephone conversations that take place between ride requestors 245 and ride providers 240 during, or immediately prior to, a particular ride. In some embodiments, the transportation management system, or a third party service, may generate, using any suitable speech recognition technology, transcriptions of monitored and recorded telephone calls that take place between the parties to a particular ride, and the transcriptions may be stored for subsequent analysis by the transportation management system. In particular embodiments, the transportation applications running on the computing devices used by ride requestors 245 and ride providers 240 may transmit, upload, or otherwise provide information exchanged between the parties and collected during, or immediately prior to, rides to the transportation management system for storage and subsequent analysis.

In particular embodiments, the transportation management system may be configured to analyze free-form text collected from text messages exchanged between ride requestors and ride providers and/or from transcriptions of phone calls between ride requestors and ride providers to identify and extract reference expressions that humans find useful in facilitating rendezvous at particular meeting locations and to filter out irrelevant expressions. In some embodiments, the transportation management system may apply natural language processing to the free-form text to extract reference expressions that are descriptive of points of interest, landmarks, street names, intersections, markers, or structures at or near meeting locations, and to filter out expressions descriptive of variable environmental conditions, user-specific identifying information, or conversation unrelated to facilitating rendezvous between the ride requestors and ride providers. For example, the collected free-form text may include a reference expression that more specifically describes the desired meeting location, such as "outside Hotel" or "on the corner," in the case of the pick-up location identified in the ride request submitted by ride requestor 245a, or "in the loading zone," in the case of the pick-up location identified in the ride request submitted by ride requestor 245c. This type of descriptive information may be useful in facilitating rendezvous between ride requestors 245 and ride providers 240. However, this type of information might or might be provided by particular ride requestors or for particular requested rides.

In particular embodiments, the free-form text collected during communications between ride requestors 245 and ride providers 240 may include reference expressions that describe desired meeting locations in terms of their locations relative to other human-visible features in the vicinity of the meeting locations, some of which may be dependent on the path being taken (or expected to be taken) to the meeting location by the ride provider 240 or by the ride requestor 245, or on a directional graph representing the points along such a path. For example, ride requestor 245a may communicate to ride provider 240a that the desired pick-up location at Hotel Z 208 is "north of" Hotel Z 208, or "to the right of" Hotel Z 208 as ride provider 240a approaches Hotel Z 208 traveling north on Second St. Similarly, ride requestor 245b may communicate to ride provider 240b that the desired pick-up location at Taco Stand 216 is "across from" Big Box Store 212, is "south of" Coffee World 218, or is "to the right of" Coffee World 218 as ride provider 240b approaches Taco Stand 216 traveling south on Third St. If ride provider 240a, rather than ride provider 240b, had accepted the ride request submitted by ride requestor 245b and was approaching Taco Stand 216 by traveling east on Ave. A and then north on Third St., ride requestor 245b may, instead, communicate to ride provider 240b that the desired pick-up location at Taco Stand 216 is "north of" Book Spot 214 or "to the left of" Book Spot 214. In another example, ride requestor 245d may communicate to ride provider 240c that the desired pick-up location at High School 226 is "at the bus stop east of" High School 226 or "at the bus stop on the corner of" Fourth St. and Ave. B. Alternatively, if ride provider 240b had accepted the ride request submitted by ride requestor 245d, rather than the ride request submitted by ride requestor 245b, and was approaching High School 226 by traveling south on Third St. and then east on Ave. B, ride requestor 245d may communicate to ride provider 240b that the desired pick-up location at High School 226 is "east of" High School 226 or "to the right of" High School 226. This type of descriptive information may also be useful in facilitating rendezvous between ride requestors 245 and ride providers 240. However, this type of information might or might be provided by particular ride requestors or for particular requested rides.

In particular embodiments, the free-form text collected during communications between ride requestors 245 and ride providers 240 may include expressions that may be useful for facilitating rendezvous at a specified meeting location for a particular ride requestor and a particular ride provider, but that might not applicable to other rides for which the same pick-up location or a similar pick-up location is specified. For example, the collected free-form text may include expressions describing variable environmental conditions (e.g., "behind the delivery truck" or "to the right of the construction fence"), user-specific identifying information (e.g., "I'm wearing a red hat" or "I have short, blond hair"), or conversation unrelated to facilitating rendezvous between the ride requestors and ride providers at specified meeting locations (e.g., "Where are you?" or "On my way.") In particular embodiments, some or all information considered extraneous to the facilitation of rendezvous between ride requestors 245 and ride providers 240 may be filtered out and discarded. In some embodiments, user-identifying information (e.g., names or descriptions of ride requestors 245 and ride providers 240, or descriptions of ride providers' vehicles) may be removed from any free-form text collected during communications between ride requestors 245 and ride providers 240 considered pertinent to the facilitation of rendezvous between ride requestors 245 and ride providers 240 when it is extracted for subsequent use as a reference expression by the transportation management system. In particular embodiments, the transportation management systems described in the present disclosure may be configured to automatically generate human-understandable geospatial descriptors for facilitating rendezvous between ride requestors 245 and ride providers 240. These descriptors may include reference expressions similar to shoes discussed above, e.g., reference expressions that more specifically describe desired meeting locations and/or reference expressions that describe desired meeting locations in terms of their locations relative to other human-visible features in the vicinity of the meeting locations, some of which may be dependent on the path being taken (or expected to be taken) to the meeting location by the ride provider 240 or by the ride requestor 245. In some embodiments, the reference expressions used to describe desired meeting locations might be different depending the environmental context in which the ridesharing service is operating. For example, phrases used to describe meeting locations in rural environments, where the identifiable visible features in the vicinity of the meeting locations may be few, far between, and of only a few different types, may be different than the phrases used to describe meeting locations in urban settings, where the number and variety of identifiable visible features can at times be overwhelming to ride requestors and/or ride providers who are trying to find each other.

In particular embodiments, a ridesharing service may build a model for generating human-understandable geospatial descriptors for various locations in an environment in which the transportation management system operates using data from a variety of sources. In particular embodiments, the model may be generated based on reference expressions extracted from free-form text representing various communications between ride requestors 245 and ride provider 240, as described above. In particular embodiments, the model may be generated based on the availability of enhanced map data. For example, map data maintained by the transportation management system or obtained through a third-party map provider or map service may be encoded with labels representing place names and/or street addresses associated with certain locations (e.g., points of interest, landmarks, street names, intersections, markers, or structures).

In some embodiments, map data maintained by the transportation management system or obtained through a third-party map provider or map service may be encoded with labels representing visible characteristics of various points of interest, landmarks, street names, intersections, marker, or structure, such as a color, shape or size. In particular embodiments, such characteristics may be extracted, using any suitable computer vision and/or object detection technologies, from one or more camera or satellite images obtained by, or on behalf of, the ridesharing service that include a particular point of interest, landmark, street name, intersection, marker, or structure. In some embodiments, the camera or satellite images may capture real-time characteristics about visible features in the vicinity of a pick-up location that may be encoded, at least temporarily, in the map data used by the transportation management system to generate human-understandable geospatial descriptors. For example, a human-understandable geospatial descriptor for a pick-up location based on real-time information may include the phrase "behind the stalled car" or "in front of the truck with the cat logo." In various embodiments, the labels representing the points of interest, landmarks, street names, intersections, markers, or structures, or characteristics thereof may be stored in association with geospatial coordinates of these human-visible features in the environment in which the ridesharing service operates, which may allow the transportation management system to determine which, if any, of the human-visible features for which the system includes a label are in the vicinity of a specified meeting location for a pick-up location and to determine a position of the specified meeting location relative to one or more of the human-visible features in the vicinity. The information encoded in the map may be used by the transportation management system when constructing a human-understandable geospatial descriptor for the specified meeting location. In particular embodiments, some or all of the information encoded in a map of the environment in which the ridesharing service operates may be provided as inputs to the model for generating human-understandable geospatial descriptors for specified locations.

In the example environment illustrated in FIG. 2, a map of environment 200 may be encoded with, or annotated to include, labels for each of the points of interest illustrated in FIG. 2, including Steak House 202, Pasta Palace 204, Hometown Bank 206, Hotel Z (208), Gas Station Q (210), Big Box Store 212, Book Spot 214, Taco Stand 216, Coffee World 218, Elementary School 220, Hardware Hut 222, Library 224, High School 226, Park 228, Hospital 230, and Hotel X (232), each of which is stored in association with geographic coordinates for the respective point of interest. In addition, the map of environment 200 may be encoded with, or annotated to include, labels representing street intersections at particular geographic coordinates, including the intersection of First St. and Ave. A, the intersection of First St. and Ave. B, the intersection of Second St. and Ave. A, the intersection of Second St. and Ave. B, the intersection of Second St. and Ave. C, the intersection of Third St. and Ave. A, the intersection of Third St. and Ave. B, the intersection of Third St. and Ave. C, the intersection of Fourth St. and Ave. B, and the intersection of Fourth St. and Ave. C. The map may be further be encoded with, or annotated to include, labels representing other human-visible features of environment 200, some of which may have been identified in or extracted from images of environment 200, including colors of the buildings, crosswalk (or crosswalk sign) 250a, stop sign 250b, bus stop (or bus stop sign) 250c, trees 250d, and/or loading zone 250e.

In particular embodiments, the transportation management system may, based on the encoded map data, determine and/or store information indicating associations between labeled features in environment 200. For example, based on the respective geographic coordinates associated with Gas Station Q (210), Book Spot 214, and the intersection of Third St. and Ave. A, the transportation management system may determine and/or store information indicating that Gas Station Q (210) is located across Third St. from Book Spot 214, and vice versa. More specifically, the transportation management system may determine and/or store information indicating that Gas Station Q (210) is across Third St. from Book Spot 214 to the west, and that Book Spot 214 is across Third St. from Gas Station Q (210) to the east. Similarly, the transportation management system may determine and/or store information indicating that Steak House 202 is west of Hometown bank 206 and south of Pasta Palace 204, that Pasta Palace 204 is west of Hotel Z (208) and north of Steak House 202, that crosswalk 250a is west of elementary school 220, that Hardware Hut 222 is south of Library 224, that Hospital 230 is west of Hotel X (232), that Gas Station Q (210) is south of Big Box Store 212, that Park 228 is north of High School 226, and that Loading Zone 250e is on the south side of Hotel X (232), among other spatial relationships.

In particular embodiments, the transportation management system may use machine learning to create and tune the model for generating human-understandable geospatial descriptors for specified locations. In some of these embodiments, the machine learning may be seeded using any or all of the reference expressions and/or encoded map data described above. In other embodiments, the encodings may be learned while the model is being trained. In particular embodiments, the transportation management system may create and tune the model for generating human-understandable geospatial descriptors for specified locations using mechanisms or techniques other than machine learning based on any or all of the reference expressions and/or encoded map data described above. For example, a template-based approach may be used to identify patterns in reference expressions and/or encoded map data associated with particular locations or types of locations and to apply the identified patterns to generate appropriate human-understandable geospatial descriptors for specified locations. In some embodiments, a rule-based template model may utilize the request place names and street names (or street addresses) when generating human-understandable geospatial descriptors for specified locations, reusing human-generated descriptors that were observed for the specific locations. In particular embodiments, a rule-based template model may apply a default description for locations of a given type that is hard-coded, or may select the most commonly used descriptor for a given location or location type (as identified by the place name or street address) based on patterns observed in human-generated descriptors. For example, the description selected by a rule-based template model for a request location whose name includes "hotel" or for which the address is labeled as a hotel may be "outside lobby of Hotel" based on the fact that this expression is a most commonly used expression used by ride requestors when the request location is a hotel. In particular embodiments, the transportation management system may create and/or tune the model based on a statistical analysis of the distribution and/or frequency with which particular visible features in the vicinity of a named location are mentioned in communications exchanged between ride requestors and ride providers when the named location is the specified pick-up location, or with which particular reference expressions are included in communications exchanged between ride requestors and ride providers when the named location, or a similar location, is specified as the pick-up location.

Figure 3:
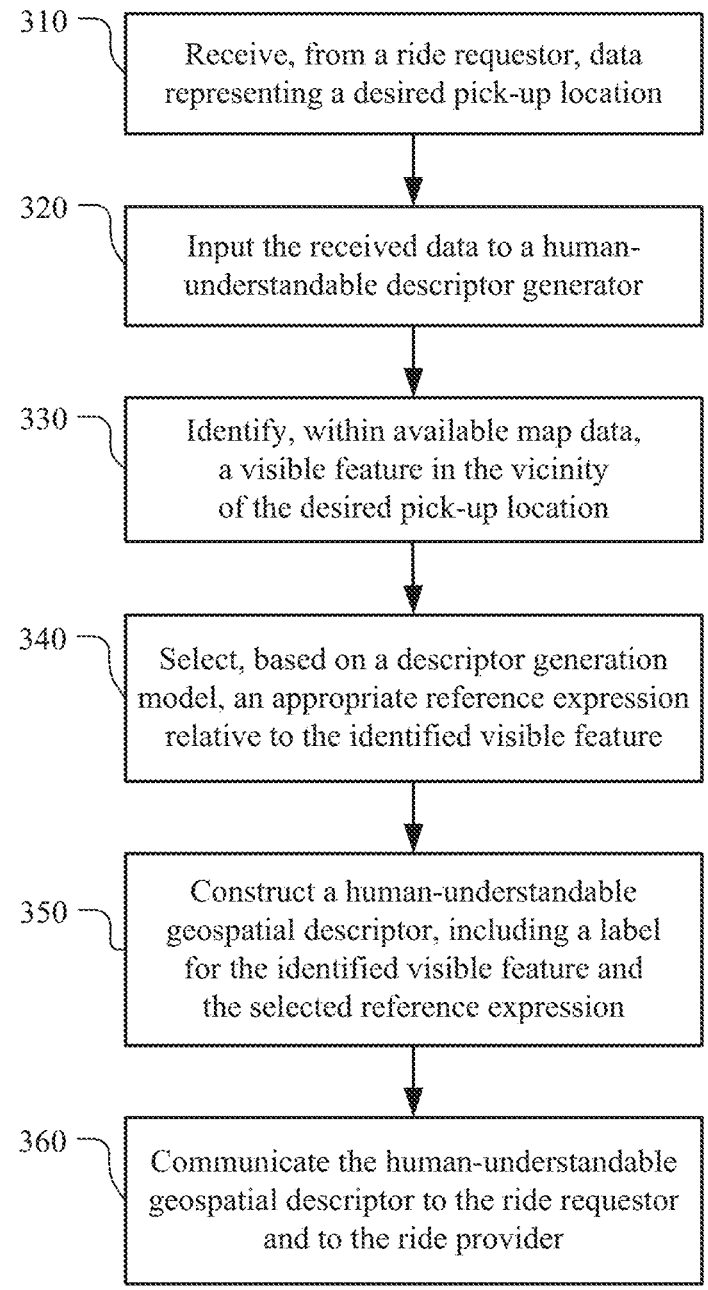
FIG. 3 illustrates an example of a method for generating a human-understandable description of a location.
Figure 4:
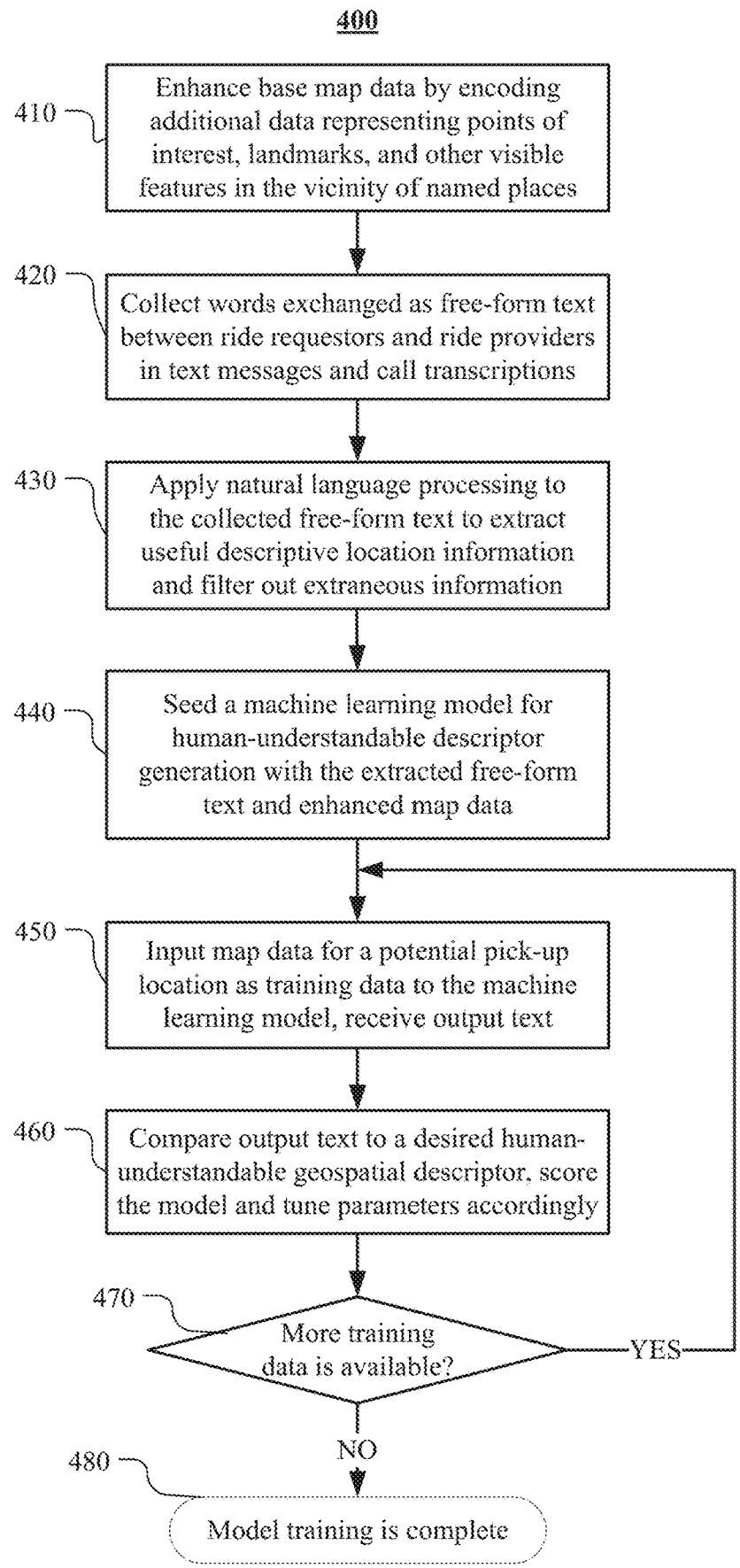
FIG. 4 illustrates an example of a method for training a machine learning model for the generation of human-understandable descriptions of locations.

Once the model for generating human-understandable geospatial descriptors for specified locations has been created and tuned, it may be used to generate human-understandable geospatial descriptors for specified locations that are represented in the seed data and/or for specified locations that are not represented in the seed data. In particular embodiments, generating a human-understandable geospatial descriptor for a specified meeting location may include identifying a human-visible feature in the vicinity of the meeting location that is associated (e.g., in encoded map data) with a label, selecting, based on a model for generating human-understandable descriptions of locations, a reference expression relative to the identified feature, and applying a grammar-based constructor to the label associated with the identified feature and the selected reference expression to form the human-understandable geospatial descriptor. An example method for generating a human-understandable description of a location is illustrated in FIG. 3 and described below. An example method for training a machine learning model for the generation of human-understandable descriptions of locations is illustrated in FIG. 4 and described below.

In one example, based in part on text collected when ride requestor 245a submits a ride request specifying a pick-up location at Hotel Z (208) using pin 260a and entering the expression "outside lobby of Hotel" as free-form text, the model may learn that when a ride requestor 245 identifies a hotel as the desired pick-up location, an expression commonly conveyed to the ride provider 240 includes the reference expression "outside lobby of Hotel." Subsequently, when ride requestor 245c submits a ride request specifying a pick-up location at Hotel X (232) using pin 260c, the model may, based on a determination that pin 260c is associated with a hotel, output the expression "outside lobby of Hotel" to be presented, along with an address or place name, to both ride requestor 245c and ride provider 240c in the transportation applications running on their respective computing devices. In another example, based in part on text collected when ride requestor 245b submits a ride request specifying a pick-up location at Taco Stand 216 using pin 260b and entering the expression "south of Coffee World," as free-form text, the model may learn that when a ride requestor 245 identifies a business as the desired pick-up location, an expression commonly conveyed to the ride provider 240 includes a reference expression indicating its position relative to a nearby business. Subsequently, if ride requestor 245 submits a ride request specifying a pick-up location at Pasta Palace 204 using a pin 260 (not shown), the model may, based on a determination that the pin 260 is associated with a place of business, output the expression "north of Pasta Palace" to be presented, along with an address or place name, to both the ride requestor 245 and the ride provider 240 who accepts the ride request in the transportation applications running on their respective computing devices. In another example, based in part on labels representing human-visible features of environment 200 and/or characteristics of those features that may have been identified in or extracted from images of environment 200 (such as a such as a color, shape or size of a visible feature in the vicinity of a specified pick-up location), the model may output an expression such as "east of the red brick building" or "to the left of the yellow crosswalk sign."

In particular embodiments, the machine learning model may learn to predict, generate, and output human-understandable geospatial descriptors for specified locations in response to receiving input representing basic location information (e.g., geographic coordinates, a place name associated with known geographic coordinates, and/or a street address associated with known geographic coordinates). The learning performed by the machine learning model during a training phase may include determining the respective importance (e.g., the relative effectiveness) of various reference expressions in facilitating rendezvous between ride requestors 245 and ride providers 240 for specific locations and/or types of locations. In some embodiments, the transportation management system may track, for each ride, both the total amount of time it takes for the ride provider 240 to locate and pick up the ride requestor 245 following the acceptance of a ride request and the amount of time that passes between the time at which the ride provider 240 reaches (or approaches) the specified meeting location and the time at which the ride provider 240 picks up the ride requestor 245.

In one example, while each of the expressions "across from Big Box Store," "south of Coffee World," "to the right of Coffee World," or "north of Book Spot" accurately describe the position of Taco Stand 216 relative to another human-visible feature of environment 200, the time it takes a ride requestor 240 to locate a ride requestor who has submitted a ride request specifying a pick-up location at Taco Stand 216 using pin 260b and entering different ones of these expressions may vary. In this example, because Big Box store 212 is so large, the expression "across from Big Box Store" could apply to at least Coffee World 218 and Taco Stand 216, if not also to Book Spot 214. Therefore, if a ride provider 240 is having difficulty locating Taco Stand 216 based on basic location information provided through the transportation application running on their computing device (e.g., an annotation on a map, a place name or a street address), a descriptor including this additional expression might not be particularly helpful for meeting a ride requestor 245 for pick up at Taco Stand 216. This may be reflected in the actual time it takes for ride providers 240 to pick up ride requestors 245 after reaching (or approaching) Taco Stand 216 with and without the presentation of this descriptor to the two parties. In this case, a descriptor indicating the position of Taco Stand 216 relative to Coffee World 218 (e.g., "south of Coffee World") or Book Spot 214 (e.g., "north of Book Spot") may be more effective, as they are more specific than "across from Big Box Store." However, if Coffee World 216 is a well known or highly recognizable place of business (e.g., more so than Book Spot 214), a descriptor indicating the position of Taco Stand 216 relative to Coffee World 218 may be even more effective than a descriptor indicating the position of Taco Stand 216 relative to Book Spot 214, which may be reflected in actual time it takes for ride providers 240 to pick up ride requestors 245 after reaching (or approaching) Taco Stand 216 with and without the presentation of these descriptors. In particular embodiments, performance metrics other than pick-up time may be used to determine the respective importance (e.g., the relative effectiveness) of various reference expressions in facilitating rendezvous between ride requestors 245 and ride providers 240 for specific locations and/or types of locations.

FIG. 3 illustrates an example method 300 for generating a human-understandable description of a location, in accordance with one or more embodiments of the present disclosure. In particular embodiments, method 300 may be performed by various elements of a transportation management system of a ridesharing service, such as transportation management system 130 illustrated in FIG. 1. For example, method 300 may be performed by a location services element of a transportation management system or by a human-understandable geospatial descriptor generator within a transportation management system or location services element thereof. Example embodiments of these elements are described below in reference to transportation management system 602 illustrated FIG. 6. Method 300 may begin at step 310, where data representing a desired pick-up location is received from a ride requestor. The data may include or represent geographic coordinates, a place name, and/or a street address associated with the desired pick-up location. In one specific example, the data may identify the request location as High School 226 shown in FIG. 2 and may include the street address or geographic coordinates associated with High School 226.

At step 320, the method may include providing the received data to a human-understandable geospatial descriptor generator as input. For example, the human-understandable descriptor generator may be configured to, predict, generate, and output human-understandable geospatial descriptors for specified locations in response to receiving input data representing basic location information (e.g., geographic coordinates, a place name associated with known geographic coordinates, and/or a street address associated with known geographic coordinates).

At step 330, the method may include identifying, within available map data, a visible feature in the vicinity of the desired pick-up location. In one example, the visible feature may be a characteristic of the desired pick-up location that is represented as a label associated with the desired pick-up location in an annotation or encoding within map data representing the environment in which the ridesharing service operates. In another example, the visible feature may be a characteristic of a point of interest, landmark, street name, intersection, marker, or structure in the vicinity of the desired pick-up location that is represented as a label associated with the point of interest, landmark, street name, intersection, marker, or structure in an annotation or encoding within the map data. In the specific example described above, the visible feature may be stop sign 250b (which is across Ave. B from High School 226), or the bus stop (or bus stop sign) 250c (which is east of High School 226).

At step 340, method 300 may include selecting, based on a descriptor generation model of the human-understandable geospatial descriptor generator, an appropriate reference expression relative to the identified visible feature. In one example, the human-understandable geospatial descriptor generator may output a reference expression that was previously used to describe the desired pick-up location. In another example, the human-understandable geospatial descriptor generator may output a reference expression that was derived from one or more reference expressions previously used to describe locations similar to the desired pick-up location. In particular embodiments, the reference expression that is output by the human-understandable geospatial descriptor generator may be or include a reference expression that has been determined to be relatively effective in facilitating rendezvous between parties at the desired pick-up location or at locations similar to the desired pick-up location based on one or more measurements of the amount of time it took a ride provider to pick up a ride requestor at various pick-up locations when the reference expression was presented to the ride requestors and ride providers and when the reference expression was not presented to the ride requestors and ride providers. The descriptor generation model may be created and tuned using machine learning or using other modeling techniques (e.g., statistical modeling techniques), in particular embodiments. In the specific example described above, when the visible feature in the vicinity of High School 226 is bus stop sign 250c, the reference expression may be or include, "east of High School 226" or "on the corner of Fourth St. and Ave. B".

At step 350, the method may include constructing a human-understandable geospatial descriptor, including a label for the identified visible feature and the selected reference expression. For example, the method may include applying a grammar-based constructor to the label associated with the identified feature and the selected reference expression to form the human-understandable geospatial descriptor. In the specific example described above, the human-understandable geospatial descriptor may be or include, "Meet me at the bus stop east of High School 226" or "Meet me at the bus stop on the corner of Fourth St. and Ave. B."

At step 360, method 300 may include communicating the human-understandable geospatial descriptor to the ride requestor and/or to the ride provider who has accepted the ride request to pick up the ride requestor at the specified pick-up location. For example, the human-understandable geospatial descriptor may be served to computing devices used by the ride requestor and the ride provider for presentation through transportation applications running on those devices instead of, or in addition to, basic location information (e.g., annotated map views, place names, and/or street addresses). In particular embodiments, the descriptor may be presented as a phrase or sentence displayed on the computing devices used by the ride requestor and the ride provider. In particular embodiments, the descriptor may be presented using an audio representation of the descriptor by the transportation application, or another application running on a device used by a ride requestor or a ride provider that can "read" text to a user. In some embodiments, the presentation of the descriptor may be augmented by highlighting the more specifically described pick-up location in a three-dimensional (3D) map displayed on the computing service with a particular color or texture in addition to presenting the descriptor as a phrase or sentence in the device's display. By automatically generating the human-understandable geospatial descriptor and serving the descriptor to the ride requestor and the ride provider, the transportation management system may improve the efficiency of pick-ups and reduce frustration for both ride requestors and ride providers when basic location information provided in a ride request is insufficient to facilitate timely rendezvous between the parties.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for generating a human-understandable description of a location including the particular steps of the method of FIG. 3, this disclosure contemplates any suitable method for generating a human-understandable description of a location including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

In particular embodiments, a transportation system of a ridesharing service may use machine learning to generate and update a model for the generation of human-understandable descriptions of locations. For example, a machine-learning model may be trained on a set of training data. Each training sample may include location information for a potential pick-up location, and a desired human-understandable descriptor for the potential pick-up location. The machine-learning model may be trained to take as input, e.g., geographic coordinates, a place name associated with known geographic coordinates, and/or a street address associated with known geographic coordinates, and to output a human-understandable geospatial descriptor that is predicted to be useful for facilitating rendezvous between ride requestors and ride providers. In particular embodiments, a transportation system of a ridesharing service may use end-to-end sequence learning implemented, e.g., by recurrent neural networks, to generate and update a model for the generation of human-understandable descriptions of locations. In other embodiments, different machine learning techniques, including any of a variety of supervised and/or unsupervised machine learning techniques, may be used to generate and update a model for the generation of human-understandable descriptions of locations.

FIG. 4 illustrates an example method 400 for training a machine learning model for the generation of human-understandable descriptions of locations, in accordance with one or more embodiments of the present disclosure. In particular embodiments, method 400 may be performed by various elements of a transportation management system of a ride-sharing service, such as transportation management system 130 illustrated in FIG. 1. For example, method 400 may be performed by a location services element of a transportation management system or by a human-understandable geospatial descriptor generator within a transportation management system or location services element thereof. Example embodiments of these elements are described below in reference to transportation management system 602 illustrated FIG. 6. Method 400 may begin at step 410, where base map data may, optionally, be enhanced by encoding additional data representing points of interest, landmarks, and other visible features (or characteristics of those features) in the vicinity of named places in the environment in which a ridesharing service operates.

At step 420, the method may, optionally, include collecting words that are exchanged, individually or within phrases or sentences, as free-form text between ride requestors and ride providers in text messages (e.g., messages exchanged within transportation applications running on the respective computing devices of the ride requestors and ride providers, SMS messages, or MMS messages) and/or transcriptions of phone calls between ride requestors and ride providers.

At step 430, the method may, optionally, include applying natural language processing to the collected free-form text to extract useful descriptive location information to be used as reference expressions by the human-understandable geospatial descriptor generator and to filter out extraneous information, as described herein. In particular embodiments, the descriptive location information may be encoded numerically (e.g., as a vector of values) to facilitate machine learning.

At step 440, the method may, optionally, include seeding a machine learning model for human-understandable descriptor generation with any extracted free-form text and/or enhanced map data, if available. For example, the extracted free-form text may be input to the model as an initial collection of potential reference expressions, or the enhanced map data maybe input to the model as an initial collection of labels for potential use in identifying visible features in the vicinity of specified pick-up locations. In particular embodiments, the machine learning model for human-understandable descriptor generation might not be seeded with such data prior to beginning a training phase. In such cases, steps 410 and 440, and/or steps 420-440 may be elided.

At step 450, the method may include inputting map data for a potential pick-up location as training data to the machine learning model, and receiving, from the machine learning model, output text generated by the machine learning model. The output text may represent an attempt to generate a human-understandable geospatial descriptor for facilitating rendezvous at the potential pick-up location identified in the input map data. In particular embodiments, the output text may include a reference expression found in an initial collection of potential reference expressions and/or a label found in an initial collection of labels, as described above. In some embodiments, including some embodiments in which the model is not seeded with initial collections of potential reference expressions and/or labels, the output text may, at least in one or more initial training steps, be generated randomly by the machine learning model. In such embodiments, the machine learning model may learn about data to be encoded as map data (e.g., reference expressions and/or labels associated with particular locations) through the training.

At step 460, method 400 may include comparing the output text to a desired human-understandable geospatial descriptor for the potential pick-up location, scoring the model with respect to the match (or lack thereof), and tuning various machine learning parameters for the model accordingly. In one example, the output text may be scored based on the number or percentage of words in the output text that overlap (or match) words in the desired descriptor.

If, at step 470, there is more training data is available, method 400 may return to step 450, after which steps 450 and 460 may be repeated any number of times using different training sample inputs representing pick-up locations and corresponding desired human-understandable geospatial descriptor outputs to continue tuning the model and improving the quality of the output text (e.g., the usefulness of the output text in facilitating rendezvous between ride requestors and ride providers). If, or once, there is no additional training data available, the training of the model may be complete, as shown at 480. In some embodiments, following an initial training phase for the model, the model may be put into use as an element of the human-understandable geospatial descriptor generator. In some embodiments, one or more additional training phases may be performed periodically or in response to changes in the environment in which the ridesharing service operates to re-tune the model and/or improve the quality of the generated human-understandable geospatial descriptors with respect to facilitating rendezvous at potential pick-up locations.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for training a machine learning model for the generation of human-understandable descriptions of locations including the particular steps of the method of FIG. 4, this disclosure contemplates any suitable method for training a machine learning model for the generation of human-understandable descriptions of locations including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
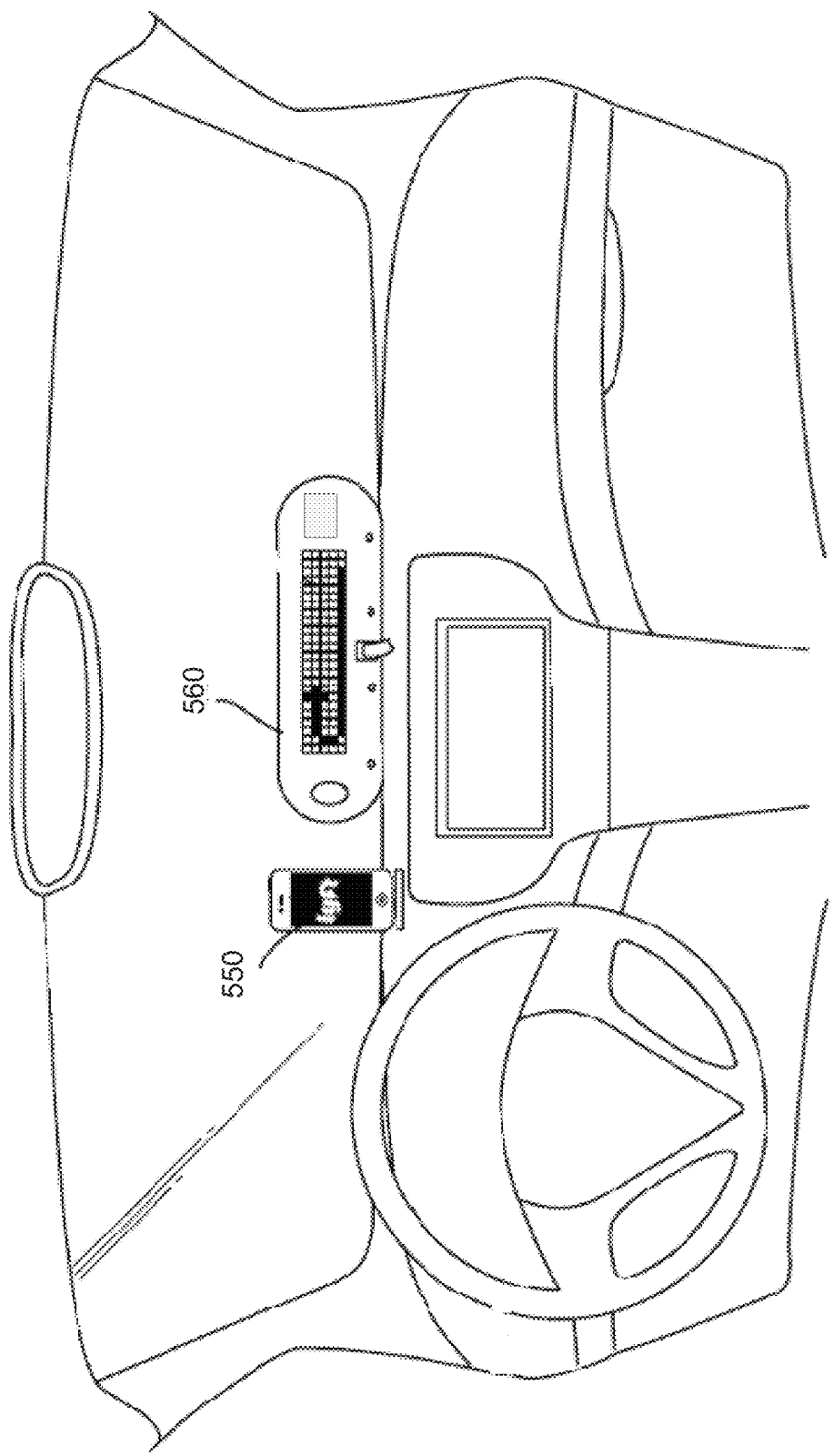
FIG. 5 illustrates an example configuration of devices in a provider's vehicle.

FIG. 5 illustrates an example configuration of devices in a ride provider's vehicle. In the example shown, a provider computing device 550 is held by a mobile device holder so that the display of the provider computing device 550 is visible to the ride provider (or driver) and any passengers in the vehicle. A transportation management vehicle device 560 may be similarly positioned so that its interior interface can be seen by the ride provider and/or any passengers. The display of the provider computing device 550 may include various display technologies including, but not limited to, one or more liquid crystal displays (LCDs), one or more arrays of light emitting diodes (LEDs), AMOLED, or other display technologies. In particular embodiments, ride requests, including basic location information for a desired pick-up location (e.g., an annotated map view, a place names, and/or a street addresses) may be served to the provider computing device 550 and presented to the ride provider on the display. In particular embodiments, human-understandable geospatial descriptors may be served to the provider computing device 550 and presented to the ride provider on the display through a transportation application running on provider computing device 550 instead of, or in addition to, basic location information for the desired pick-up location.

In particular embodiments, the provider computing device 550 and/or the transportation management vehicle device 560 may both include sensors for monitoring the passenger compartment of the vehicle (as used herein, "passenger compartment" refers to the area of a vehicle designed and intended for the seating of the driver and other passengers). Examples of sensors may include: a camera for capturing visible data; a microphone for capturing audible data, including conversations held between the ride provider and a ride requestor while attempting to locate each other; infrared sensors for detecting heat emitted by passengers; gyroscopes and accelerometers for detecting vehicle motion; and any other sensors suitable for detecting environmental signals occurring in the passenger compartment of the vehicle. In particular embodiments, such sensors may be integrated with the vehicle (e.g., traditional human-driven vehicles or autonomous vehicles) or with a detachable device, such as the transportation management vehicle device 560. The sensors may be located at any suitable location, such as in the upper corners of the passenger compartment, the dashboard, seats, side doors, ceiling, rear view mirror, central console, floor, or any other location where the sensor would be effective in detecting the type of signals it is designed for.

In particular embodiments, the transportation management vehicle device 560 may be physically connected to the ride provider's computing device and/or the requestor's computing device when these devices are located within the vehicle's interior. In particular embodiments, a connector (not shown) may be provided for physically connecting the transportation management vehicle device 560 to the vehicle for power and/or for communicating with the vehicle. In one instance, the connector may implement the controller area network (CAN) interface or any other suitable communication interface or protocol for communicating with a vehicle. In another instance, the connector may include a CAN bus interface that may be utilized in communicating with a vehicle. For example, the CAN bus interface may interface with an on-board diagnostics (OBD) port (e.g., an OBD-I port, an OBD-II port, etc.) of the vehicle. In particular embodiments, through the connector, the transportation management vehicle device 560 may be able to issue instructions to the vehicle's onboard computer and cause it to adjust certain vehicle configurations, such as air-conditioning level, entertainment/informational content (e.g., music, news station, content source, etc.), audio volume, window configuration, seat warmer temperature, and any other configurable features of the vehicle. As another example, the connector may enable the transportation management vehicle device 560 to query the vehicle for certain data, such as current configurations of any of the aforementioned features, as well as the vehicle's speed, fuel level, tire pressure, external temperature gauge, navigation system, and any other information available through the vehicle's computing system. In particular embodiments, the transportation management vehicle device 560 may be further configured with wireless communication capabilities (e.g., Bluetooth, WI-FI, NFC, etc.), thereby enabling the device 560 to wirelessly communicate with the vehicle, the provider's computing device, and/or the requestor's computing device. In particular embodiments, the transportation management vehicle device 560 may include a communication component for managing communications with other systems, including, e.g., the ride provider device, a ride requestor device, the vehicle, the transportation management system, and third-party systems (e.g., music, entertainment, traffic, and/or maps providers). In particular embodiments, a communication component may be configured to communicate over WI-FI, Bluetooth, NFC, RF, or any other wired or wireless communication network or protocol.

Figure 6:
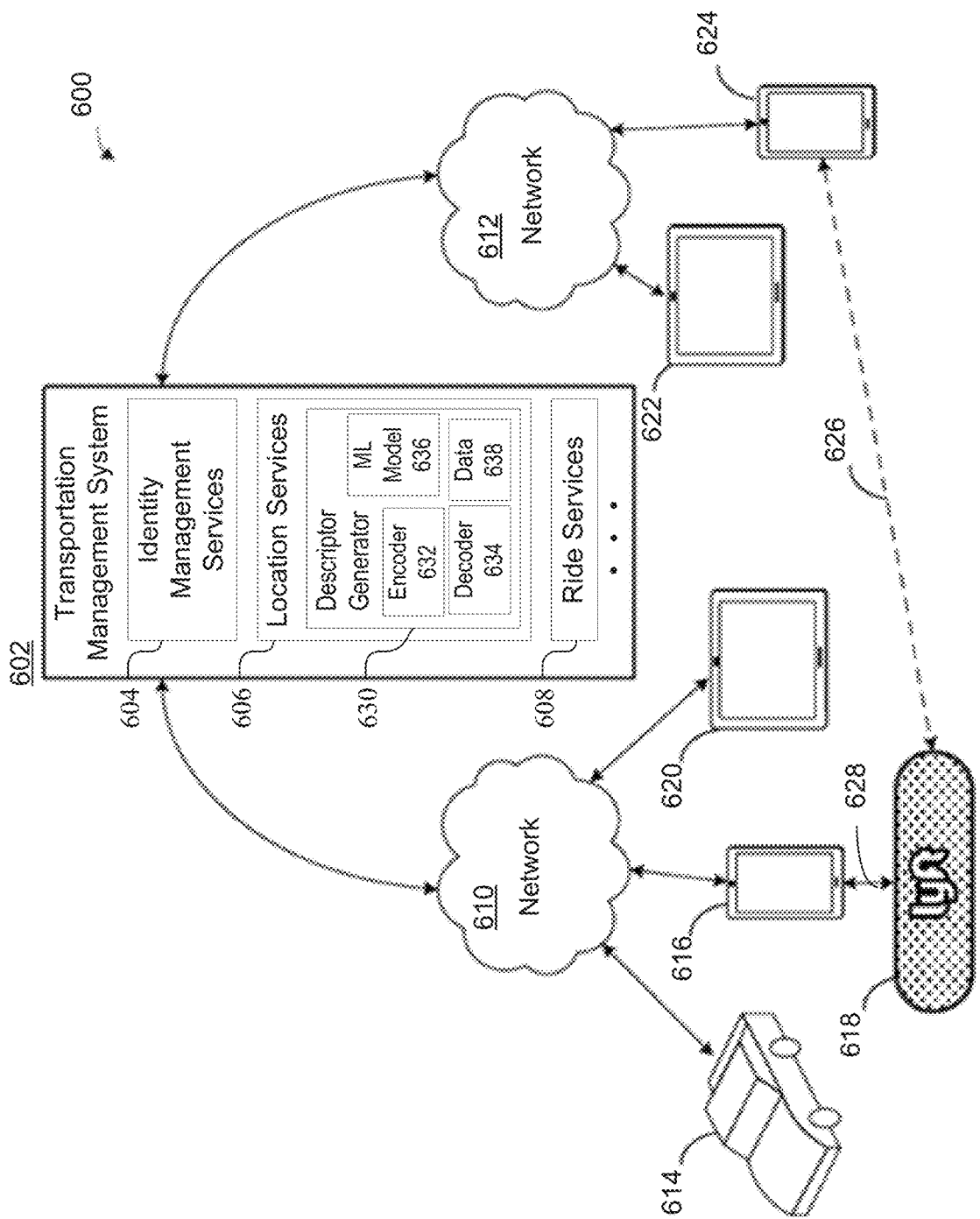
FIG. 6 illustrates an example block diagram of a transportation management environment.

FIG. 6 shows a transportation management environment 600, in accordance with particular embodiments. For example, a transportation management system 602 executing on one or more servers or distributed systems may be configured to provide various services to ride requestors and providers. In particular embodiments, the transportation management system 602 may include software modules or applications, including, e.g., identity management services 604, location services 606, ride services 608, and/or any other suitable services. Although a particular number of services are shown as being provided by system 602, more or fewer services may be provided in various embodiments. In addition, although these services are shown as being provided by the system 602, all or a portion of any of the services may be processed in a distributed fashion. For example, computations associated with a service task may be performed by a combination of the transportation management system 602 (including any number of servers, databases, etc.), one or more devices associated with the provider (e.g., devices integrated with the managed vehicles 614, provider's computing devices 616 and tablets 620, and transportation management vehicle devices 618), and/or one or more devices associated with the ride requestor (e.g., the requestor's computing devices 624 and tablets 622). In particular embodiments, the transportation management system 602 may include one or more general purpose computers, server computers, distributed computing systems, clustered computing systems, cloud-based computing systems, or any other computing systems or arrangements of computing systems. The transportation management system 602 may be configured to run any or all of the services and/or software applications described herein. In particular embodiments, the transportation management system 602 may include an appropriate operating system as well as various server applications, such as web servers capable of handling hypertext transport protocol (HTTP) requests, file transfer protocol (FTP) servers, database servers, etc.

In particular embodiments, identity management services 604 may be configured to, e.g., perform authorization services for requestors and providers and manage their interactions and data with the transportation management system 602. This may include, e.g., authenticating the identity of providers and determining that they are authorized to provide services through the transportation management system 602. Similarly, requestors' identities may be authenticated to determine whether they are authorized to receive the requested services through the transportation management system 602. Identity management services 604 may also manage and control access to provider and requestor data maintained by the transportation management system 602, such as driving and/or ride histories, vehicle data, personal data, preferences, usage patterns as a ride provider and as a ride requestor, profile pictures, linked third-party accounts (e.g., credentials for music or entertainment services, social-networking systems, calendar systems, task-management systems, etc.) and any other associated information. The management service 604 may also manage and control access to provider/requestor data stored with and/or obtained from third-party systems. For example, a requester or provider may grant the transportation management system 602 access to a third-party email, calendar, or task management system (e.g., via the user's credentials). As another example, a requestor or provider may grant, through his/her mobile device (e.g., 616, 620, 622, and 624), a transportation application associated with the transportation management system 602 access to data provided by other applications installed on the mobile device. Such data may be processed on the client and/or uploaded to the transportation management system 602 for processing, if so desired.

In particular embodiments, the transportation management system 602 may provide location services 606, which may include navigation and/or traffic management services and user interfaces. For example, the location services 606 may be responsible for querying devices associated with the provider (e.g., vehicle 614, computing device 616, tablet 620, transportation management vehicle device 618) and the requester (e.g., computing device 624 and tablet 622) for their locations. The location services 606 may also be configured to track those devices to determine their relative proximities, generate relevant alerts (e.g., proximity is within a threshold distance), generate navigation recommendations, and any other location-based services.

In particular embodiments, location services 606 may include a human-understandable geospatial descriptor generator 630, such as those described herein. In particular embodiments, human-understandable geospatial descriptor generator 630 may be a software module that is called by the transportation management system and/or may be provided by a third party. In particular embodiments, human-understandable geospatial descriptor generator 630 may be a called service within the transportation management system that receives data representing a request location and returns a human-understandable geospatial descriptor. In the example embodiment illustrated in FIG. 6, the human-understandable geospatial descriptor generator 630 includes an encoder 632, a decoder 634, a machine learning model 636 for generating human-understandable geospatial descriptors for specified pick-up locations, and data store 638. In particular embodiments, data store 638 may include free-form text extracted from text messages and/or phone calls between ride requestors and ride providers, reference expressions, and/or enhanced map data, if available. In particular embodiments, some or all of the data in data store 638 may be used to seed machine learning model 636 prior to a training phase for the model. In at least some of these embodiments, natural language processing may be applied to the free-form text in data store 638 to extract reference expressions including location descriptions and to filter out extraneous information prior to providing the data for seeding machine learning model 636. In particular embodiments, end-to-end sequence learning, or another machine learning technique, may be used to create and tune the model for generating human-understandable geospatial descriptors for specified locations.

Once machine learning model 636 has been created and tuned, it may be used to generate human-understandable geospatial descriptors for specified pick-up locations that are represented in the seed data and/or for specified locations that are not represented in the seed data. In particular embodiments, some or all of the encodings may be learned while machine learning model 636 is being trained. In some embodiments, encoder 632 may be configured to vectorize or otherwise encode the map data and/or the reference expressions to be stored in data store 638 to put the information in a form in which it can be fed to the machine learning model 636 as inputs. For example, data store 638 may include a large corpus or dictionary of words and phrases seen in communications between ride requestors and ride providers and/or use in previously generated human-understandable geospatial descriptors. In some embodiments, decoder 634 may be configured to apply a grammar-based constructor to labels within the map data that are associated with identified features and to selected reference expressions generated by machine learning model 636 to form the human-understandable geospatial descriptors that are output from human-understandable geospatial descriptor generator 630. The human-understandable geospatial descriptors that are output from human-understandable geospatial descriptor generator 630 may be served to devices associated with the provider (e.g., vehicle 614, computing device 616, tablet 620, transportation management vehicle device 618) and the requester (e.g., computing device 624 and tablet 622) for presentation along with, or instead of, basic location information for desired pick-up locations.

In particular embodiments, the transportation management system 602 may provide ride services 608, which may include ride matching and management services to connect a requestor to a provider. For example, after the identify of a ride requestor has been authenticated by the identity management services module 604, the ride services module 608 may attempt to match the requestor with one or more ride providers. In particular embodiments, the ride services module 608 may identify an appropriate provider using location data obtained from the location services module 606. The ride services module 608 may use the location data to identify providers who are geographically close to the requestor (e.g., within a certain threshold distance or travel time) and further identify those who are a good match with the requestor. The ride services module 608 may implement matching algorithms that score providers based on, e.g.: preferences of providers and requestors; vehicle features, amenities, condition, and status; provider's preferred general travel direction, range of travel, and availability; requestor's origination and destination locations, time constraints, and vehicle feature needs; and any other pertinent information for matching requestors with providers. In particular embodiments, the ride services 608 may use rule-based algorithms or machine-learning models for matching requestors and providers.

The transportation management system 602 may communicatively connect to various devices through networks 610 and 612. Networks 610, 612 may include any combination of interconnected networks configured to send and/or receive data communications using various communication protocols and transmission technologies. In particular embodiments, networks 610, 612 may include local area networks (LAN), wide-area network, and/or the Internet, and may support communication protocols such as transmission control protocol/Internet protocol (TCP/IP), Internet packet exchange (IPX), systems network architecture (SNA), and any other suitable network protocols. In particular embodiments, data may be transmitted through networks 610, 612 using a mobile network (such as a mobile telephone network, cellular network, satellite network, or other mobile network), PSTNs (a public switched telephone networks), wired communication protocols (e.g., USB, CAN), and/or wireless communication protocols (e.g., WLAN technologies implementing the IEEE 802.11 family of standards, Bluetooth, Bluetooth Low Energy, NFC, Z-Wave, and ZigBee). In particular embodiments, networks 610, 612 may each include any combination of networks described herein or known to one of ordinary skill in the art.

In particular embodiments, devices within a vehicle may be interconnected. For example, any combination of the following may be communicatively connected: vehicle 614, provider computing device 616, provider tablet 620, transportation management vehicle device 618, requestor computing device 624, requestor tablet 622, and any other device (e.g., smart watch, smart tags, etc.). For example, the transportation management vehicle device 618 may be communicatively connected to the provider computing device 616 and/or the requestor computing device 624. The transportation management vehicle device 618 may connect 626, 628 to those devices via any suitable communication technology, including, e.g., WLAN technologies implementing the IEEE 802.11 family of standards, Bluetooth, Bluetooth Low Energy, NFC, Z-Wave, ZigBee, and any other suitable short-range wireless communication technology.

In particular embodiments, users may utilize and interface with one or more services provided by the transportation management system 602 using applications executing on their respective computing devices (e.g., 614, 616, 618, and/or 620), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In particular embodiments, provider computing device 614 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In particular embodiments, one or more software applications may be installed on the computing device of a provider or requestor, including an application associated with the transportation management system 602. The transportation application may, for example, be distributed by an entity associated with the transportation management system via any distribution channel, such as an online source from which applications may be downloaded and/or via physical media, such as CDs and DVDs. Additional third-party applications unassociated with the transportation management system may also be installed on the computing device. In particular embodiments, the transportation application may communicate or share data and resources with one or more of the installed third-party applications.

While particular embodiments of the present disclosure are described in terms of a ridesharing service in which the ride providers are human drivers operating their own vehicles, in other embodiments, the techniques described herein for generating human-understandable geospatial descriptors may also be used in environments in which ride requests are fulfilled using autonomous vehicles. For example, a transportation management system of a ridesharing service may facilitate the fulfillment of ride requests using both human drivers and autonomous vehicles. When ride requests are fulfilled by human drivers, free-form text within text messages or phone conversations between the ride providers (human drivers) and the ride requestors may be monitored and collected as described above, and may be used to create and/or tune a machine learning model for generating human-understandable geospatial descriptors for specified pick-up locations. When ride requests submitted by ride requestors are fulfilled by human drivers, the human-understandable geospatial descriptors generated for the specified pick-up locations may be provided to both the ride requestor and the ride provider to assist them in finding each other. When ride requests submitted by ride requestors are fulfilled by autonomous vehicles, human-understandable geospatial descriptors generated for the specified pick-up locations may be provided to the ride requestors to assist them in finding the autonomous vehicles dispatched to pick them up. In this case, the autonomous vehicles may be served with machine understandable navigation instructions to direct them to the locations described in the human-understandable geospatial descriptors that are sent to the ride requestors, where applicable. For example, a ride requestor may be presented with a human-understandable geospatial descriptor suggesting that the ride requestor should expect to be picked up "in the loading zone", "in front of the building" or "on the east side of the building," at a specified pick-up location and an autonomous vehicle may receive navigation instructions directing it to the loading zone, to the front of the building, to the side of the building at the specified pick-up location.

While particular embodiments are described in terms of a ridesharing service, the systems and method described herein may be more generally applicable in any environment in which an application provides location services to facilitate a meeting of multiple parties at a desired meeting location through client applications executing on computing devices of the parties. For example, the disclosed techniques may be applied within a dating application or a social media application through which application users arrange to meet each other at locations specified using basic location information. In these applications, the incorporation of techniques described herein for generating human-understandable geospatial descriptors may facilitate rendezvous of the parties that have agreed to meet.

Particular embodiments described herein relate to generating, by a transportation management system, a human-understandable geospatial descriptor for a specified meeting location, such as a pick-up location at which a ride requestor and a ride provider may rendezvous. In particular embodiments, the transportation management system may utilize pickup data to learn how to describe locations to reduce messaging between ride requestors and ride providers. In particular embodiments, the data may include any or all of the following:

Request Location Data: place name, full address, and/or geographic coordinates (latitude and longitude) of the intended pickup location Map Data: nearby location data, such as labels associated with visible features within walking distance of the request location Ground Truth Description: contents of SMS text messages and/or transcriptions of calls sent from a ride requestor to a ride provider subsequent to a ride request and prior to pickup In particular embodiments, the transportation management systems described herein may use machine learning or other mechanisms to create and tune a model for generating human-understandable geospatial descriptors for specified locations. In one example, the transportation management system may use a rule-based template model that utilizes only request place names and street names to generate the descriptors. This information may always be relevant to the generation of the descriptors and human-understandable. However, there may be limited variety in the generated descriptors, and may involve repeated request information.

In another example, the transportation management system may use a preposition map to create and tune a model for generating human-understandable geospatial descriptors for specified locations. In this example, given a set of texts parsed into preposition-object pairs <t,l> and a request location r, for each preposition p∈P, the process capability of such an approach may be defined as follows:

$$c_p = \frac{\sum_{i=1}^{T} 1\{p = t_i\} x(r, l_i)}{\sum_{i=1}^{T} 1\{p = t_i\}}$$

Figure 7:
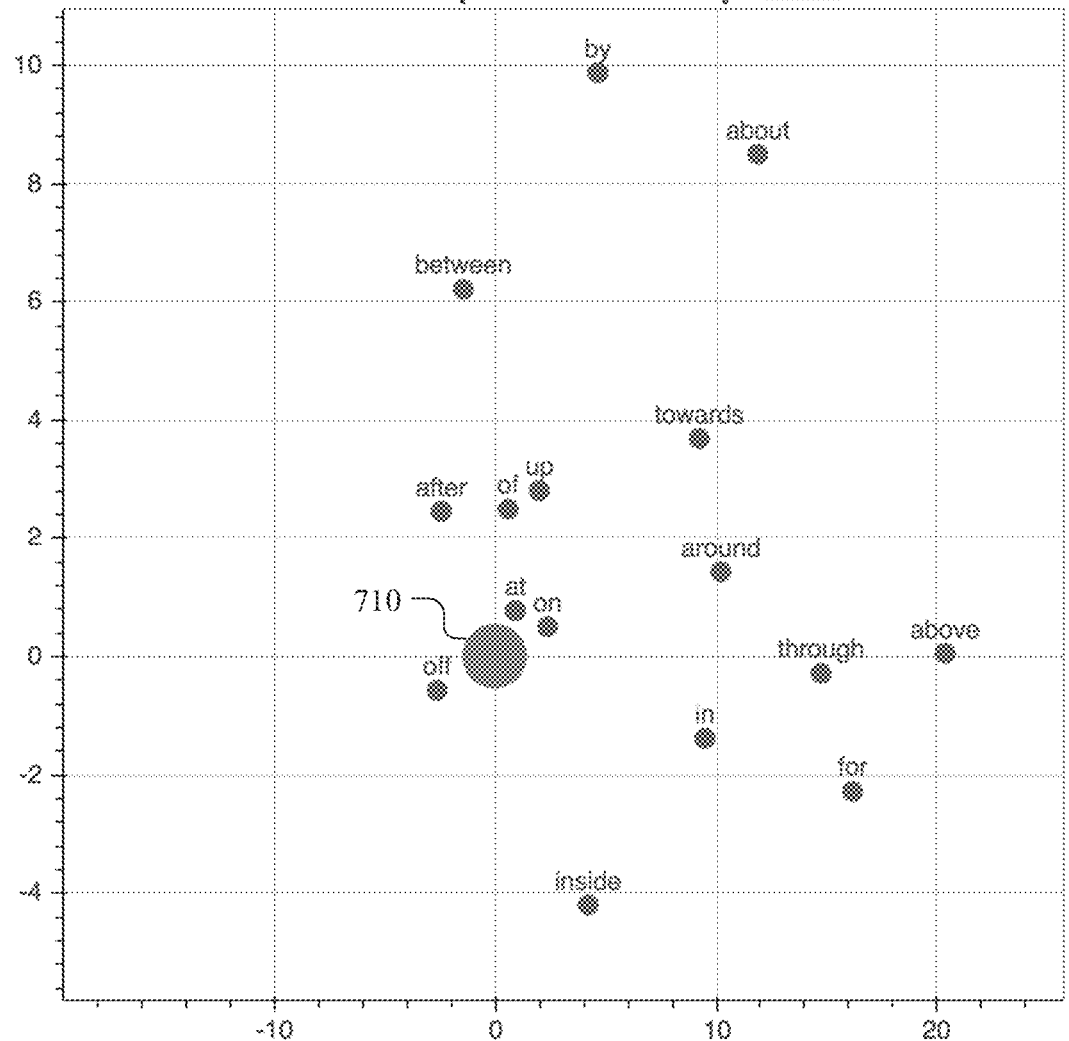
FIG. 7 illustrates an example preposition map.

An example preposition map based on this approach is illustrated in FIG. 7. More specifically, FIG. 7 illustrates an example preposition map 700 for a particular user facing upwards from their request location (shown as 710). This approach may capture spatial relationships and the frequency of terms used. However, it may be sensitive to outliers.

In yet another example, the transportation management system may use end-to-end learning to generate and update a model for the generation of human-understandable descriptions of locations, as described above. In particular embodiments, the transportation management system may use sequence-to-sequence learning with an attention model. In one example embodiment, the training of the model may involve deep Long Short Term Memory (LSTM) recurrent neural networks (e.g., with four layers), a vocabulary size of about 30k words (when tf>1), and an embedding size of 128. In this example embodiment, the input data may be represented using the following format:

name1 big box store #street1 third street #number1 3207 #distance1 29 #name2 hotel x #street2 avenue C #number2 804 #distance2 41

The results of a comparison of the performance of these approaches in creating and tuning a model for generating human-understandable geospatial descriptors for specified locations is shown in Table 1 below. The results are presented in terms of Recall-Oriented Understudy for Gisting Evaluation (ROUGE) metrics, which is a set of metrics for evaluating machine translated or machine produced texts by comparing machine generated text to human generated text.

TABLE 1

Comparative Results

| Approach | ROUGE-1 | | ROUGE-2 | |
| --- | --- | --- | --- | --- |
| | Precision | Recall | Precision | Recall |
| Template Model | 0.33 | 0.26 | 0.15 | 0.12 |
| Preposition Map | 0.39 | 0.33 | 0.15 | 0.12 |
| Seq2Seq Learning | 0.52 | 0.19 | 0.24 | 0.06 |
| Human Generated | 0.70 | 0.62 | 0.66 | 0.58 |

The results presented above illustrate that generating human-understandable geospatial descriptors for specified locations by combining natural language text and geospatial data can be very technically challenging. For example, user preference may not be fully captured by these metrics. In addition, in a typical collection of collected pickup data, approximately 40% of text messages exchanged between ride requestors and ride providers do not include any geospatial text descriptions, while many others include additional contexts that are not useful as training data for the model and might even be counterproductive to the training. Furthermore, the learning task may be complicated by the speech patterns used within SMS text messages and by the fact that text messages are of variable lengths. Finally, the ROUGE metric may be skewed by the lengths of the predictions across models.

In particular embodiments, different input data representations may be used to capture geospatial relationships than those described above. For example, in some embodiments, the input data may include better ground truth data (e.g., data that takes into account user bias and/or data that has been "cleaned" prior to use). In particular embodiments, different metrics may be used to capture the performance of different approaches for creating and tuning a model for generating human-understandable geospatial descriptors for specified locations than those described above, including metrics that are specially defined to capture human understandability and relevance. In particular embodiments, the map data used in generating human-understandable geospatial descriptors for specified locations may include richer map and/or building annotations than those described above, may include map data that provides better coverage than the map data described above, and/or may benefit from map data standardization efforts. In particular embodiments, the transportation management system may use separate models for navigation assistance and information sharing.

Figure 8:
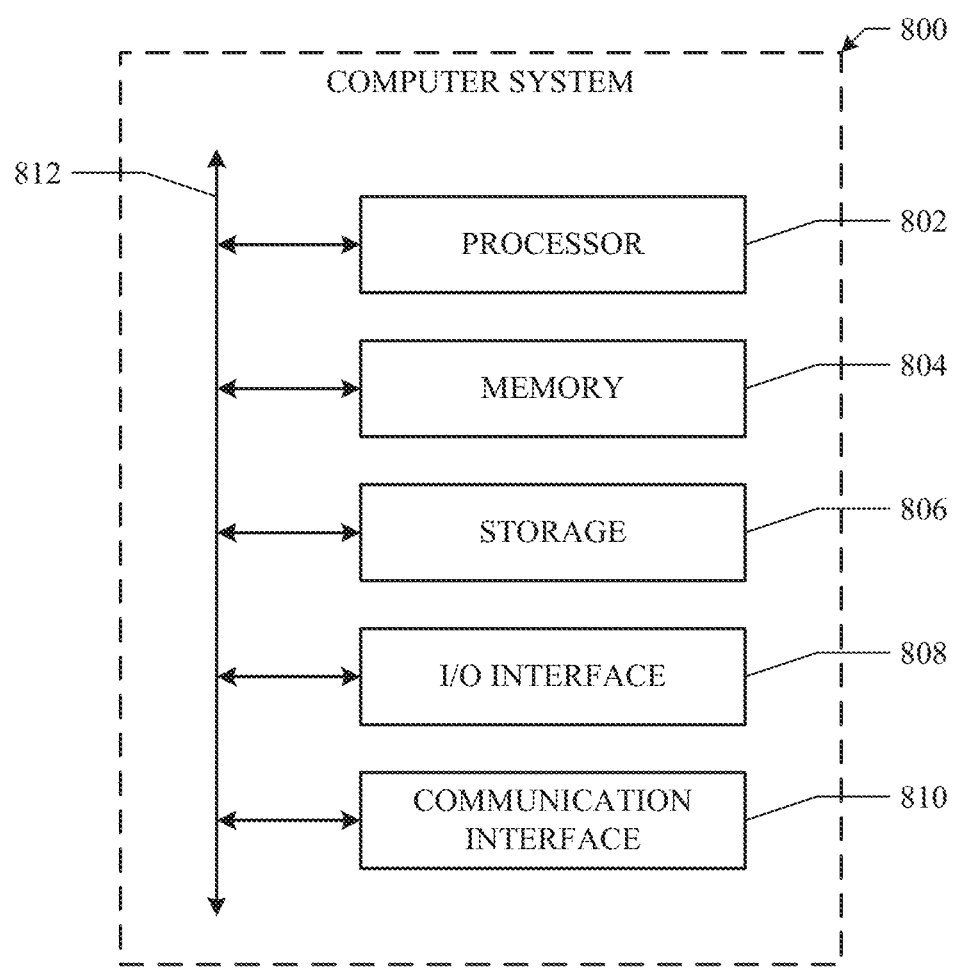
FIG. 8 illustrates an example of a computing system.

FIG. 8 illustrates an example computer system 800. In particular embodiments, one or more computer systems 800 may implement the functionality of any of a user device (such as device 120, 550, 616, 620, 622, or 624) which may belong to a ride requestor (such as requestor 110) or a ride provider, a transportation management system or device (such as system 130 or 602, or device 550 or 618), an autonomous vehicle, or a third-party system. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor, or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804.

Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described in further detail below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   receiving location data including a request location associated with a ride request application;
   identifying a human-visible feature in vicinity of the request location, the identified human-visible feature being associated with a label;
   selecting, based on a descriptor generation model, a reference expression relative to the identified human-visible feature, wherein the descriptor generation model is developed by:
      collecting free-form text included in communications exchanged between parties,
      identifying, within the free-form text, one or more reference expressions associated with one or more human-visible features at one or more respective locations, and
      seeding the descriptor generation model with the one or more reference expressions and one or more labels utilized to identify the one or more respective locations; and
   applying a grammar-based constructor to the label associated with the identified human-visible feature and the selected reference expression to generate a human-understandable geospatial descriptor for the request location; and
   sending a representation of the human-understandable geospatial descriptor to an electronic device of at least one party associated with the ride request application for presentation by the electronic device of the at least one party to facilitate a ride request.

2. The method of claim 1, wherein, to generate the human-understandable geospatial descriptor, the method further comprises:
   obtaining, from encoded map data including a plurality of labels stored in association with additional location data for respective points of interest, landmarks, street names, intersections, markers, or structures, wherein the plurality of labels comprises the one or more labels utilized to identify the one or more respective locations.

3. The method of claim 1, wherein the descriptor generation model is developed based on a machine learning model, and the method further comprises:
   tuning the descriptor generation model based on the machine learning model.

4. The method of claim 1, wherein the descriptor generation model is further developed by:
   generating a data set including labels associated with the location data, each label representing a visible characteristic of a point of interest, a landmark, a street name, an intersection, a marker, or a structure extracted from an image including the point of interest, the landmark, the street name, the intersection, the marker, or the structure; and
   seeding the descriptor generation model with the generated data set.

5. The method of claim 1, wherein the parties comprise a first user of the ride request application executing on the electronic device and a second user of the ride request application executing on a second electronic device, wherein the ride request application is configured to facilitate rendezvous between the parties, and wherein collecting the free-form text included in communications exchanged between the parties comprises collecting free-form text including text exchanged between the parties within short message service texts, text exchanged between the parties within multimedia messaging service texts, text exchanged between the parties within the ride request application, or text obtained from transcripts of calls exchanged between the parties.

6. The method of claim 1, wherein the selected reference expression is derived from the one or more reference expressions identified within the free-form text and are associated with one or more human-visible feature at respective locations other than the request location.

7. The method of claim 1, wherein the one or more reference expressions include reference expressions descriptive of a relative position with respect to a point of interest, a landmark, a street name, an intersection, a marker, or a structure.

8. The method of claim 1, wherein, to identify, within the free-form text, the one or more reference expressions, the method further comprises:
   applying natural language processing to the free-form text to extract expressions descriptive of points of interest, landmarks, street names, intersections, markers, or structures at a plurality of locations and to filter out expressions descriptive of variable environmental conditions, user-specific identifying information, or conversation unrelated to facilitating rendezvous between the parties.

9. The method of claim 1, wherein the request location is a location at which two parties are to rendezvous, the two parties including a ride requestor and a ride provider each utilizing the ride request application, and wherein identifying the human-visible feature and selecting the reference expression are based on a determined path between the ride requestor and the request location or a determined path between the ride provider and the request location.

10. The method of claim 1, wherein the descriptor generation model is further developed by determining a level of importance of the one or more reference expressions with respect to facilitating rendezvous between the parties.

11. A system comprising:
one or more processors; and
one or more computer-readable non-transitory storage media coupled to the one or more processors, the one or more computer-readable non-transitory storage media comprising instructions operable when executed by the one or more processors cause the system to perform operations comprising:
receiving location data including a request location associated with a ride request application;
identifying a human-visible feature in vicinity of the request location, the identified human-visible feature being associated with a label;
selecting, based on a descriptor generation model, a reference expression relative to the identified human-visible feature, wherein the descriptor generation model is developed by:
collecting free-form text included in communications exchanged between parties,
identifying, within the free-form text, one or more reference expressions associated with one or more human-visible features at one or more respective locations, and
seeding the descriptor generation model with the one or more reference expressions and one or more labels utilized to identify the one or more respective locations; and
applying a grammar-based constructor to the label associated with the identified human-visible feature and the selected reference expression to generate a human-understandable geospatial descriptor for the request location; and
sending a representation of the human-understandable geospatial descriptor to an electronic device of at least one party associated with the ride request application for presentation by the electronic device of the at least one party to facilitate a ride request by the electronic device associated with the at least one party to facilitate the ride request.

12. The system of claim 11, wherein:
the parties comprise a first user of the ride request application executing on the electronic device and a second user of the ride request application executing on a second electronic device, wherein the ride request application is configured to facilitate rendezvous between the parties, and wherein collecting the free-form text included in communications exchanged between the parties comprises free-form text including text exchanged between the parties within short message service texts, text exchanged between the parties within multimedia messaging service texts, text exchanged between the parties within the ride request application, or text obtained from transcripts of calls exchanged between the parties.

13. The system of claim 11, wherein the selected reference expression is derived from the one or more reference expressions identified within the free-form text and are associated with one or more human-visible feature at respective locations other than the request location.

14. The system of claim 11, wherein, to identify, within the free-form text, the one or more reference expressions further comprises:
applying natural language processing to the free-form text to extract expressions descriptive of points of interest, landmarks, street names, intersections, markers, or structures at a plurality of locations and to filter out expressions descriptive of variable environmental conditions, user-specific identifying information, or conversation unrelated to facilitating rendezvous between the parties.

15. The system of claim 11, wherein the descriptor generation model is further developed by determining a level of importance of the one or more reference expressions with respect to facilitating rendezvous between the parties.

16. One or more computer-readable non-transitory storage media including instructions that are operable when executed by one or more processors cause the one or more processors to perform operations comprising:
receiving location data including a request location associated with a ride request application;
identifying a human-visible feature in vicinity of the request location, the identified human-visible feature being associated with a label;
selecting, based on a descriptor generation model, a reference expression relative to the identified human-visible feature, wherein the descriptor generation model is developed by:
collecting free-form text included in communications exchanged between parties,
identifying, within the free-form text, one or more reference expressions associated with one or more human-visible features at one or more respective locations, and
seeding the descriptor generation model with the one or more reference expressions and one or more labels utilized to identify the one or more respective locations; and
applying a grammar-based constructor to the label associated with the identified human-visible feature and the selected reference expression to generate a human-understandable geospatial descriptor for the request location; and
sending a representation of the human-understandable geospatial descriptor to an electronic device of at least one party associated with the ride request application for presentation by the electronic device of the at least one party to facilitate a ride request.

17. The one or more computer-readable non-transitory storage media of claim 16, wherein the parties comprise a first user of the ride request application executing on the electronic device and a second user of the ride request application executing on a second electronic device, wherein the ride request application is configured to facilitate rendezvous between the parties, and wherein collecting the free-form text included in communications exchanged between the parties comprises collecting free-form text including text exchanged between the parties within short message service texts, text exchanged between the parties within multimedia messaging service texts, text exchanged between the parties within the ride request application, or text obtained from transcripts of calls exchanged between the parties.

18. The one or more computer-readable non-transitory storage media of claim 16, wherein the selected reference expression is derived from the one or more reference expressions identified within the free-form text and are associated with one or more human-visible feature at respective locations other than the request location.

19. The one or more computer-readable non-transitory storage media of claim 16, wherein, to identify, within the free-form text, the one or more reference expressions further comprises:

applying natural language processing to the free-form text to extract expressions descriptive of points of interest, landmarks, street names, intersections, markers, or structures at a plurality of locations and to filter out expressions descriptive of variable environmental conditions, user-specific identifying information, or conversation unrelated to facilitating rendezvous between the parties.

20. The one or more computer-readable non-transitory storage media of claim 16, wherein the descriptor generation model is further developed by determining a level of importance of the one or more reference expressions with respect to facilitating rendezvous between the parties.

\* \* \* \* \*